(12) United States Patent
Watanabe et al.

(10) Patent No.: US 11,926,038 B2
(45) Date of Patent: Mar. 12, 2024

(54) INFORMATION PROCESSING APPARATUS AND INFORMATION PROCESSING METHOD

(71) Applicant: SONY CORPORATION, Tokyo (JP)

(72) Inventors: Ryo Watanabe, Tokyo (JP); Shin Yoshimura, Tokyo (JP); Toshihisa Sanbommatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 462 days.

(21) Appl. No.: 16/959,513

(22) PCT Filed: Oct. 22, 2018

(86) PCT No.: PCT/JP2018/039117
§ 371 (c)(1),
(2) Date: Jul. 1, 2020

(87) PCT Pub. No.: WO2019/138640
PCT Pub. Date: Jul. 18, 2019

(65) Prior Publication Data
US 2021/0053232 A1 Feb. 25, 2021

(30) Foreign Application Priority Data
Jan. 10, 2018 (JP) .................. 2018-002002

(51) Int. Cl.
*B25J 13/08* (2006.01)
*B25J 9/16* (2006.01)
(Continued)

(52) U.S. Cl.
CPC ........... *B25J 13/089* (2013.01); *B25J 9/1664* (2013.01); *B25J 19/023* (2013.01);
(Continued)

(58) Field of Classification Search
CPC .. G05D 1/0272; G05D 1/0253; G05D 1/0251; G05D 1/027
See application file for complete search history.

(56) References Cited

U.S. PATENT DOCUMENTS 8,155,870 B2 * 4/2012 Madsen ............... A01B 69/001
701/523
10,042,361 B2 * 8/2018 Collins .................. G01C 21/04
(Continued)

FOREIGN PATENT DOCUMENTS

CN 1637675 A 7/2005
CN 106859504 A 6/2017
(Continued)

OTHER PUBLICATIONS

International Search Report and Written Opinion of PCT Application No. PCT/JP2018/039117, dated Jan. 22, 2019, 12 pages of ISRWO.

*Primary Examiner* — Nicholas Kiswanto
(74) *Attorney, Agent, or Firm* — CHIP LAW GROUP

(57) ABSTRACT

There is provided an information processing apparatus including a controller that, when an autonomous mobile object estimates a self-position, determines which of a first estimation method using a result of sensing by a first sensor unit configured to sense internal world information in relation to the autonomous mobile object and a second estimation method using a result of sensing by a second sensor unit configured to sense external world information in relation to the autonomous mobile object is used by the autonomous mobile object based on whether a state of the autonomous mobile object is a stopped state.

16 Claims, 19 Drawing Sheets

(51) Int. Cl.
*B25J 19/02* (2006.01)
*G01C 21/16* (2006.01)
*G05D 1/00* (2006.01)
*G05D 1/02* (2020.01)
*G06V 20/40* (2022.01)

(52) U.S. Cl.
CPC ....... *G01C 21/1656* (2020.08); *G05D 1/0251* (2013.01); *G05D 1/0253* (2013.01); *G05D 1/027* (2013.01); *G05D 1/0272* (2013.01); *G06V 20/46* (2022.01)

(56) References Cited

U.S. PATENT DOCUMENTS

| | | | |
|---|---|---|---|
| 10,133,278 B2 * | 11/2018 | Shin | G05D 1/027 |
| 10,579,068 B2 * | 3/2020 | Madsen | G01C 21/1656 |
| 11,313,684 B2 * | 4/2022 | Chiu | G06K 9/6232 |
| 2005/0137750 A1 | 6/2005 | Shim et al. | |
| 2012/0121161 A1 * | 5/2012 | Eade | G05D 1/0253 901/1 |
| 2012/0219207 A1 * | 8/2012 | Shin | G05D 1/0272 901/50 |
| 2013/0166134 A1 * | 6/2013 | Shitamoto | G05D 1/024 701/26 |
| 2013/0331988 A1 * | 12/2013 | Goel | G05D 1/027 700/254 |
| 2017/0168498 A1 | 6/2017 | Nakajima | |
| 2020/0217666 A1 * | 7/2020 | Zhang | G01C 21/206 |

FOREIGN PATENT DOCUMENTS

| | | |
|---|---|---|
| EP | 1548534 A2 | 6/2005 |
| JP | 01-134606 A | 5/1989 |
| JP | 06-161550 A | 6/1994 |
| JP | 2005-182834 A | 7/2005 |
| JP | 2009-193097 A | 8/2009 |
| JP | 2011-209203 A | 10/2011 |
| JP | 2015-036840 A | 2/2015 |
| JP | 2017-107425 A | 6/2017 |

* cited by examiner

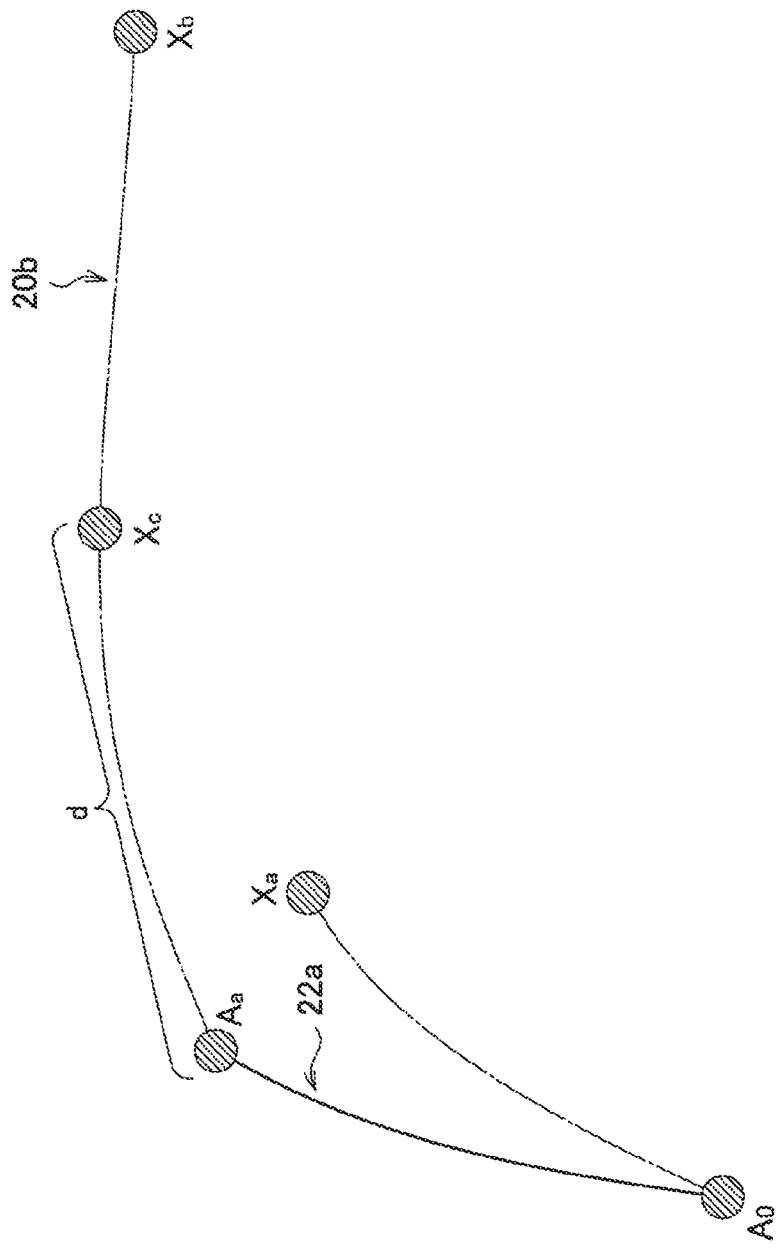

FIG.5

|  | SUCCESSIVE SELF-POSITION ESTIMATION | DISCRETE SELF-POSITION ESTIMATION |
|---|---|---|
| SENSOR | INTERNAL-WORLD SENSOR | EXTERNAL-WORLD SENSOR |
| PHYSICAL QUANTITY | SPEED $(\dot{x}, \dot{y}, \dot{z})$<br>ACCELERATION $(\ddot{x}, \ddot{y}, \ddot{z})$<br>RELATIVE POSITION $(\Delta x, \Delta y, \Delta z)$<br>ANGULAR VELOCITY $(\dot{\phi}, \dot{\theta}, \dot{\psi})$ | POSITION $(x, y, z)$<br>POSTURE $(\phi, \theta, \psi)$ |
| MEASURING ABSOLUTE POSITION AND POSTURE | MEASURABLE | NOT MEASURABLE |
| RATE OF ACQUISITION | HIGH | LOW |

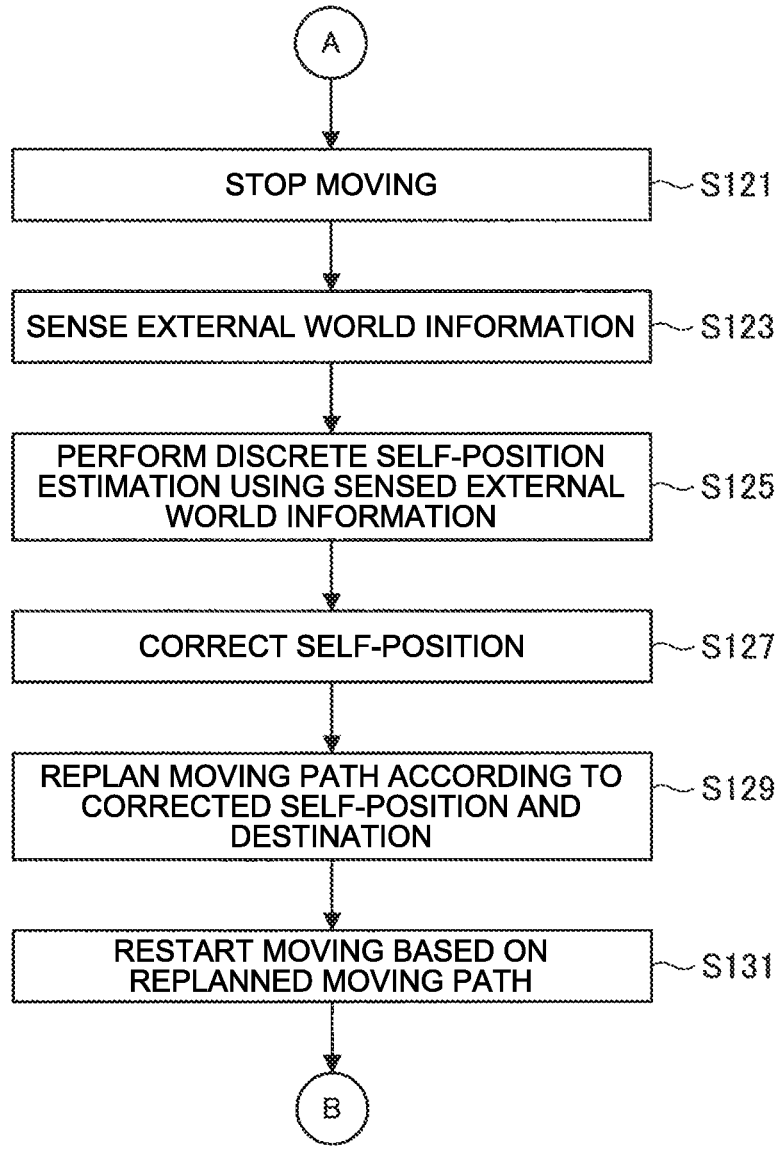

| METHOD | CUMULATIVE ERROR | CPU UTILIZATION |
|---|---|---|
| SUCCESSIVE SELF-POSITION ESTIMATION | YES | LOW |
| DISCRETE SELF-POSITION ESTIMATION | NO | HIGH |

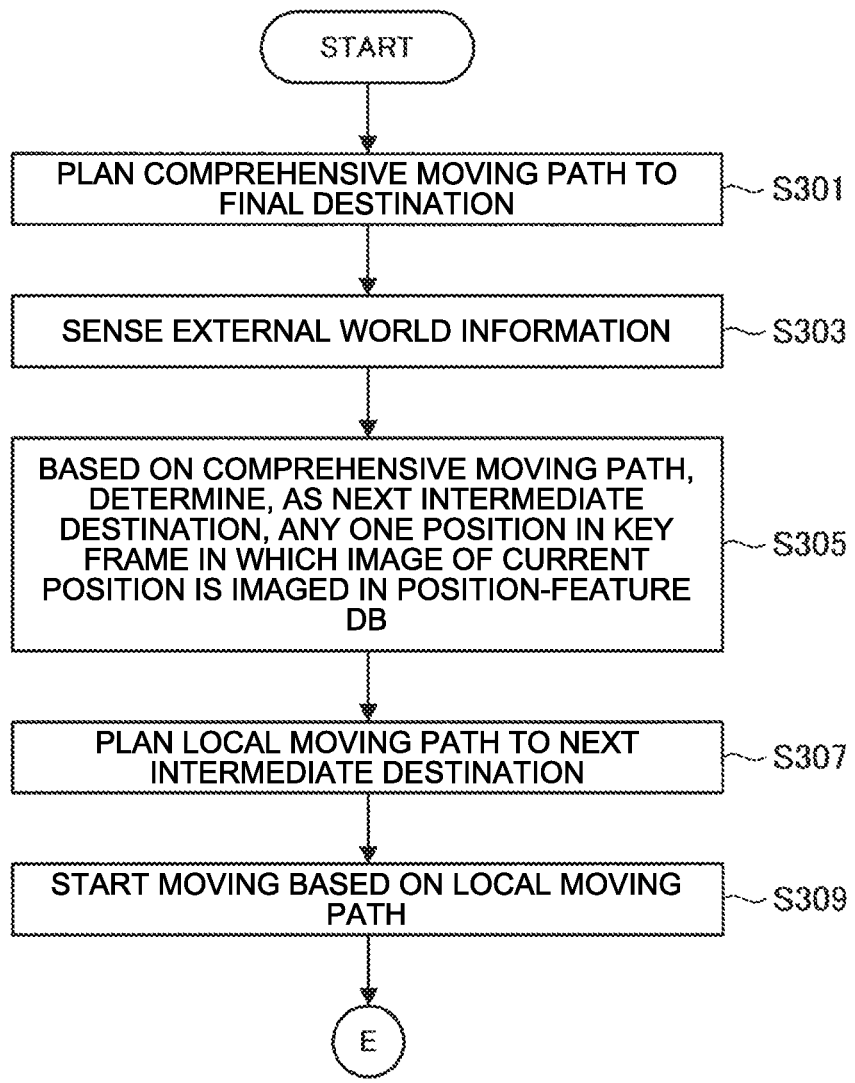

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/039117 filed on Oct. 22, 2018, which claims priority benefit of Japanese Patent Application No. JP 2018-002002 filed in the Japan Patent Office on Jan. 10, 2018. Each of the above-referenced applications is hereby incorporated herein by reference in its entirety.

FIELD

The present disclosure relates to an information processing apparatus, an information processing method and a program.

BACKGROUND

Various machines that, for example, recognize the situation of an outer world and thus autonomously perform operations (for example, vehicles and robots) have been proposed.

For example, Patent Literature 1 discloses that an autonomous vehicle estimates a self-position of the autonomous vehicle by collating a result of measuring the surrounding landscape and a map that is stored.

CITATION LIST

Patent Literature

Patent Literature 1: JP 2015-36840 A

Technical Problem

The autonomous vehicle described in Patent Literature 1 however estimates a self-position using the same method regardless of the state of the autonomous vehicle. For example, with the technique described in Patent Literature 1, it is not possible to change the method of estimating a self-position according to whether the state of the autonomous vehicle is a stopped state.

The disclosure thus provides a novel and improved information processing apparatus capable of determining a method of estimating a self-position of an autonomous mobile object adaptively to the state of the autonomous mobile object; an information processing method; and a program.

Solution to Problem

According to the disclosure, an information processing apparatus including: a controller that, when an autonomous mobile object estimates a self-position, determines which of a first estimation method using a result of sensing by a first sensor unit configured to sense internal world information in relation to the autonomous mobile object and a second estimation method using a result of sensing by a second sensor unit configured to sense external world information in relation to the autonomous mobile object is used by the autonomous mobile object based on whether a state of the autonomous mobile object is a stopped state is provided.

According to the disclosure, an information processing method including: by a processor, when an autonomous mobile object estimates a self-position, determining which of a first estimation method using a result of sensing by a first sensor unit configured to sense internal world information in relation to the autonomous mobile object and a second estimation method using a result of sensing by a second sensor unit configured to sense external world information in relation to the autonomous mobile object is used by the autonomous mobile object based on whether a state of the autonomous mobile object is a stopped state is provided.

According to the disclosure, a program for causing a computer to function as a controller that, when an autonomous mobile object estimates a self-position, determines which of a first estimation method using a result of sensing by a first sensor unit configured to sense internal world information in relation to the autonomous mobile object and a second estimation method using a result of sensing by a second sensor unit configured to sense external world information in relation to the autonomous mobile object is used by the autonomous mobile object based on whether a state of the autonomous mobile object is a stopped state is provided.

Advantageous Effects of Invention

As described above, according to the disclosure, it is possible to determine a method of estimating a self-position of an autonomous mobile object adaptively to the state of an autonomous mobile object. The effect described herein is not necessarily restrictive and any of the effects described in the disclosure may apply.

BRIEF DESCRIPTION OF DRAWINGS

FIG. 3B is a diagram illustrating the example of determining a stop position according to the embodiment.

FIG. 5 is a table illustrating a difference between two types of self-position estimating method according to the embodiment.

FIG. 8 is a flowchart illustrating part of the process flow according to the embodiment.

FIG. 9 is a table representing a difference between two types of state according to the embodiment.

FIG. 15 is a flowchart illustrating part of a process flow according to Application Example 2 of the embodiment.

DESCRIPTION OF EMBODIMENTS

With reference to the accompanying drawings, a preferable embodiment of the disclosure will be described in detail below. In the description and drawings, the same numbers are added to components that have substantially the same functions and redundant description is thus omitted.

In the specification and drawings, multiple components having substantially the same functional configurations may be distinguished from one another by adding different alphabets to the end of the same numbers. For example, multiple components having substantially the same functional configurations are distinguished like an internal world sensor unit 172a and an internal world sensor unit 172b. Note that when it is not particularly required to distinguish multiple components having substantially the same functional configurations, only the same numbers are added. For example, when it is not particularly necessary to distinguish the internal world sensor unit 172a and the internal world sensor unit 172b, they are simply referred to as internal world sensor units 172.

Description will be given according to the order of items represented below.
1. Overview
2. Detailed description of Embodiment
3. Application Examples
4. Modifications 1. Overview The disclosure can be carried out in various modes as an example as described in detail in "2. Detailed Description of Embodiment". First of all, an exemplary external configuration of an autonomous mobile object 10 according to the embodiment will be described with reference to FIGS. 1A and 1B. The autonomous mobile object 10 is an example of an information processing apparatus according to the disclosure.

Figure 1A:
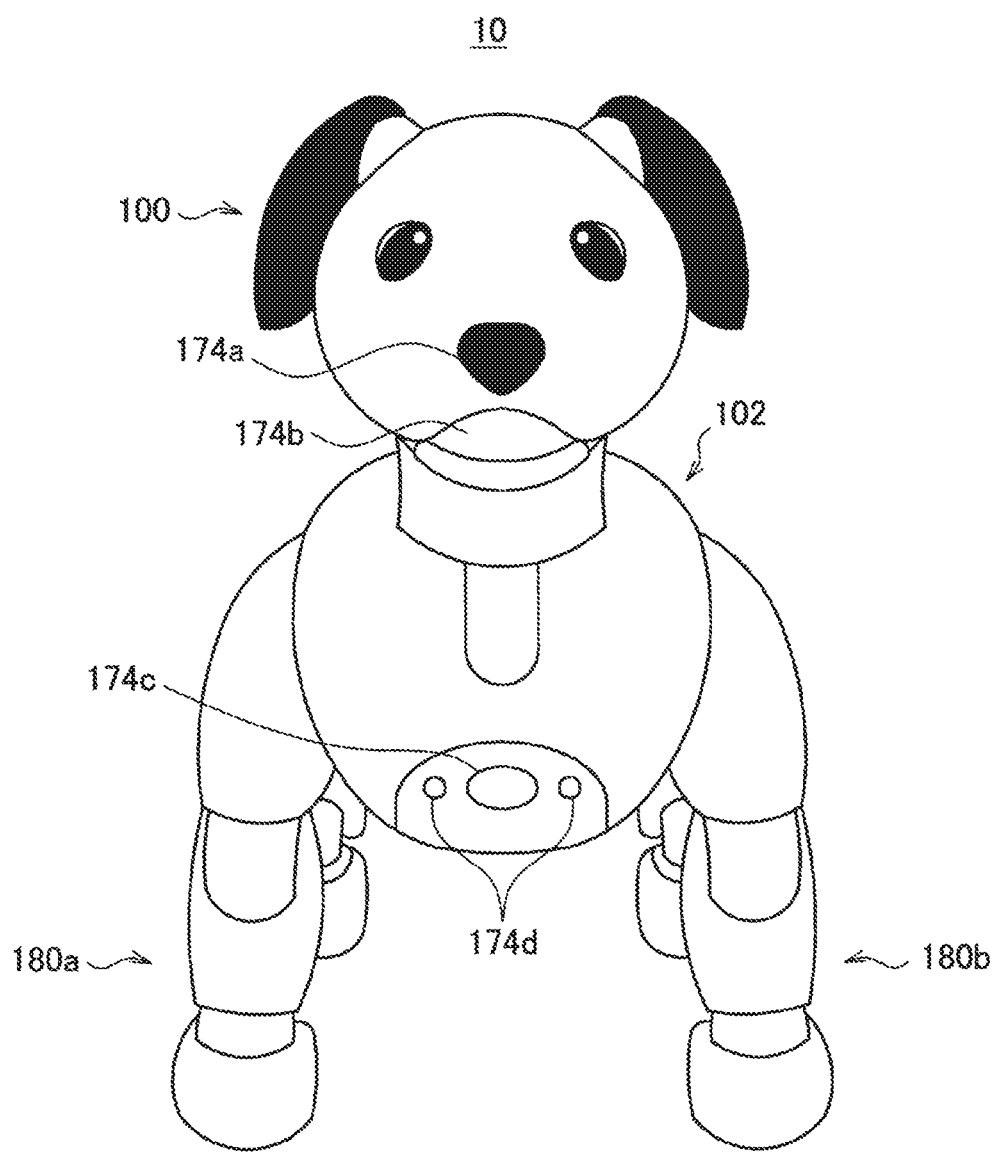
FIG. 1A is a schematic front view of an autonomous mobile object 10 according to an embodiment of the disclosure.
Figure 1B:
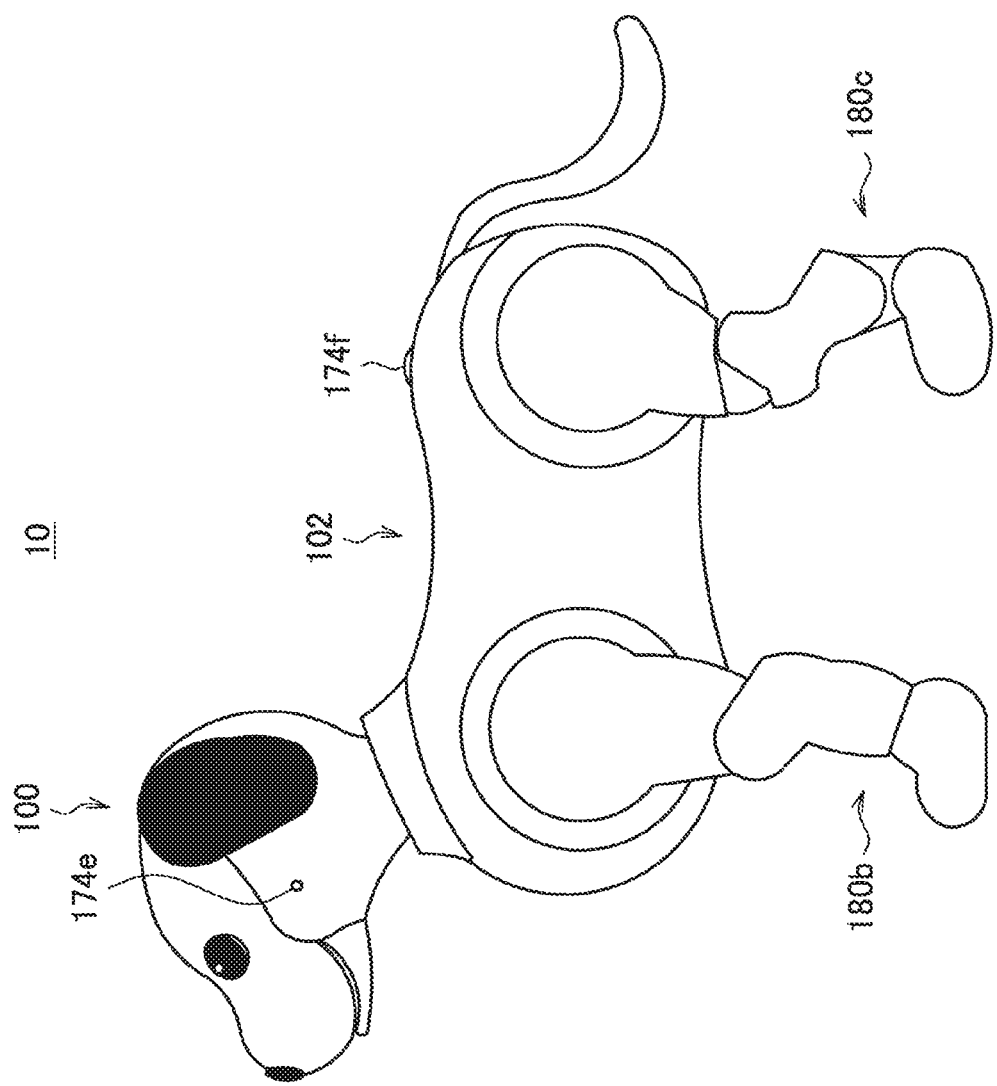
FIG. 1B is a schematic left side view of the autonomous mobile object 10 according to the embodiment.

In the embodiment, the autonomous mobile object 10 can be an apparatus (machine) that is autonomously mobile using an electric and/or magnetic function. As illustrated in FIGS. 1A and 1B, the autonomous mobile object 10 can be, for example, a robot (for example, a pet robot) that is capable of autonomously moving (for example, walking) on the ground. Note that the embodiment is not limited to the example and the autonomous mobile object 10 is preferably a machine (apparatus) that is autonomously mobile using an electric and/or magnetic function or another general mobile apparatus. For example, the autonomous mobile object 10 may be one of other types of robot (for example, a humanoid robot and a drone), vehicles (for example, an automobile, a ship, or a flying object), and various industrial machines and toys.

When behaving (moving), the autonomous mobile object 10 can behave while estimating a self-position. The self-position of the autonomous mobile object 10 can represent an absolute position of the autonomous mobile object 10 in a real space. The self-position may further represent the posture of the autonomous mobile object 10 in the real space.

FIG. 1A is a schematic front view of the autonomous mobile object 10. FIG. 1B is a schematic left side view of the autonomous mobile object 10. As illustrated in FIGS. 1A and 1B, the autonomous mobile object 10 can include a head 100, a body 102, and a mobile mechanism 180.

For example, the autonomous mobile object 10 includes a plurality of joints in at least one of the head 100, the body 102, and the mobile mechanism 180. Furthermore, an actuator is arranged in each of the joints and the actuators are driven under the control of a controller 150 to be described below and accordingly the joints are respectively rotatable about given axes. Thus, the autonomous mobile object 10 can implement an objective movement. For example, a neck joint may be arranged between the head 100 and the body 102 such that the head 100 is rotatable about a given axis with respect to the body 102. A hip joint may be arranged between the individual leg 180 and the body 102 such that the individual leg 180 is rotatable about a given axis with respect to the body 102.

The autonomous mobile object 10 includes an internal world sensor unit 172 configured to sense internal world information in relation to the autonomous mobile object 10 and an external world sensor unit 174 configured to sense external world information in relation to the autonomous mobile object 10. The internal world sensor unit 172 is an example of the first sensor unit according to the disclosure. The external world sensor unit 174 is an example of the second sensor unit according to the disclosure.

1-1. Internal World Sensor Unit 172

The internal world sensor unit 172 can be configured to sense (measure) internal world information periodically. The internal world information can be information representing an internal state of the autonomous mobile object 10. For example, the internal world information includes the speed of the autonomous mobile object 10, the acceleration of the autonomous mobile object 10, the relative position of the autonomous mobile object 10, or the angular velocity of the autonomous mobile object 10. When the autonomous mobile object 10 has at least one joint, the internal world information may include the angle of rotation of each joint in the autonomous mobile object 10 or the rate of rotation of each joint.

For example, the internal world sensor unit 172 includes a triaxial sensor, a triaxial gyro sensor, an encoder, and/or a wheel encoder. In the example illustrated in FIGS. 1A and 1B, at least one triaxial sensor and at least one triaxial gyro sensor are arranged respectively in the head 100 and the body 102. An encoder can be arranged in each joint of the autonomous mobile object 10. This makes it possible to sense an angle of rotation or a rate of rotation of each joint.

In the example illustrated in FIGS. 1A and 1B, based on sensing values from the encoders arranged in the respective joints of the autonomous mobile object 10 and the shape of the autonomous mobile object 10, a parallel shift component and a posture component around a yaw axis of the autonomous mobile object 10 can be calculated. Furthermore, based on the result of sensing by the triaxial gyro sensor and the triaxial acceleration sensor (IMU: Inertial Measurement Unit) included in the internal world sensor unit 172, a posture component around a pitch axis and a posture component around a roll axis of the autonomous mobile object 10 can be calculated.

1-2. External World Sensor Unit 174

The external world sensor unit 174 is configured to sense external world information in relation to the autonomous mobile object 10. The external world information can be information on an environment around the autonomous mobile object 10. For example, the external world information can include captured images of the surroundings of the autonomous mobile object 10, the distance to each other object from the autonomous mobile object 10, the sound around the autonomous mobile object 10, the terrestrial magnetism around the autonomous mobile object 10 and/or the signal quality for wireless communication around the autonomous mobile object 10.

As illustrated in FIG. 1A and FIG. 1B, for example, the external world sensor unit 174 can include a camera (such as a front camera 174a and a fisheye camera 174f), a depth sensor 174b (for example, a ToF (Time of Flight) sensor or a stereo camera), a human detection sensor 174c, a distance sensor 174d and/or a microphone 174e. In the example illustrated in FIG. 1B, the fisheye camera 174f can, for example, capture a video of a semi-sphere space of the surroundings of the fisheye camera 174f.

The external world sensor unit 174 may further include a LIDAR (Light Detection And Ranging), a magnetic sensor and/or a communication interface for communication according to, for example, a given standard, such as Bluetooth (trademark) or Wi-Fi (trademark). The external world sensor unit 174 may further include a receiver that receives a positioning signal from a positioning satellite, such as the GPS (Global Positioning System) or the GLONASS (Global Navigation Satellite System).

1-3. Mobile Mechanism 180

The mobile mechanism 180 is a mechanism for the autonomous mobile object 10 to move. For example, as illustrated in FIGS. 1A and 1B, the mobile mechanism 180 can be configured by including the legs (for example, two legs or four legs) to walk. The number of legs is not particularly limited and may be any number. The mobile mechanism 180 may be configured by including a plurality of wheels instead of the legs or may be configured by including a tracked mechanism, such as a caterpillar (trademark).

For example, the mobile mechanism 180 includes at least one actuator. In this case, the at least one actuator is driven based on a power that is supplied from a power unit (not illustrated in the drawing) in the autonomous mobile object 10 and a control signal that is supplied from a movement controller 158 to be described below and accordingly the autonomous mobile object 10 can move.

1-4. Digesting Problem

An external configuration of the autonomous mobile object 10 has been described. The method of estimating a self-position preferable to the autonomous mobile object 10 can differ depending on whether the autonomous mobile object 10 is moving or is stopped. For example, when the autonomous mobile object 10 is moving, it is preferable that it is possible to successively acquire (estimate) a self-position from the point of view of tracking a trace to be made by moving. When the autonomous mobile object 10 is moving, a self-position estimating method involving less intensive operations (for example, lower CPU (Central Processing Unit) utilization) of the autonomous mobile object 10 is preferable. On the other hand, when self-positions are acquired successively (when sets of internal world information that is successively sensed by the internal world sensor unit 172 are integrated), in general, the cumulative error increases as the distance that the autonomous mobile object 10 has moved increases.

On the other hand, when the autonomous mobile object 10 is stopped, it is unnecessary to track the trace and thus acquiring a self-position not successively is not a problem. When the autonomous mobile object 10 is stopped, it is unnecessary to perform computation on moving operations and thus it is possible to use a self-position estimation method involving more intensive operations than when the autonomous mobile object 10 is moving.

Focusing on the above-described circumstances led to creation of the autonomous mobile object 10 according to the embodiment. When estimating a self-position, the autonomous mobile object 10 according to the embodiment determines which of successive self-position estimation using a result of sensing by the internal world sensor unit 172 and discrete self-position estimation using a result of sensing by the external world sensor unit 174 based on whether the state of the autonomous mobile object 10 is a stopped state. Thus, in the situation in which the autonomous mobile object 10 repeats the stopped state and the moving state, it is possible to estimate a self-position more appropriately. The successive self-position estimation is an example of the first estimation method according to the disclosure. The discrete self-estimation method is an example of the second estimation method according to the disclosure. The content of the embodiment will be described sequentially in detail below.

2. Detailed Description of Embodiment 2-1. Functional Configuration

Figure 2:
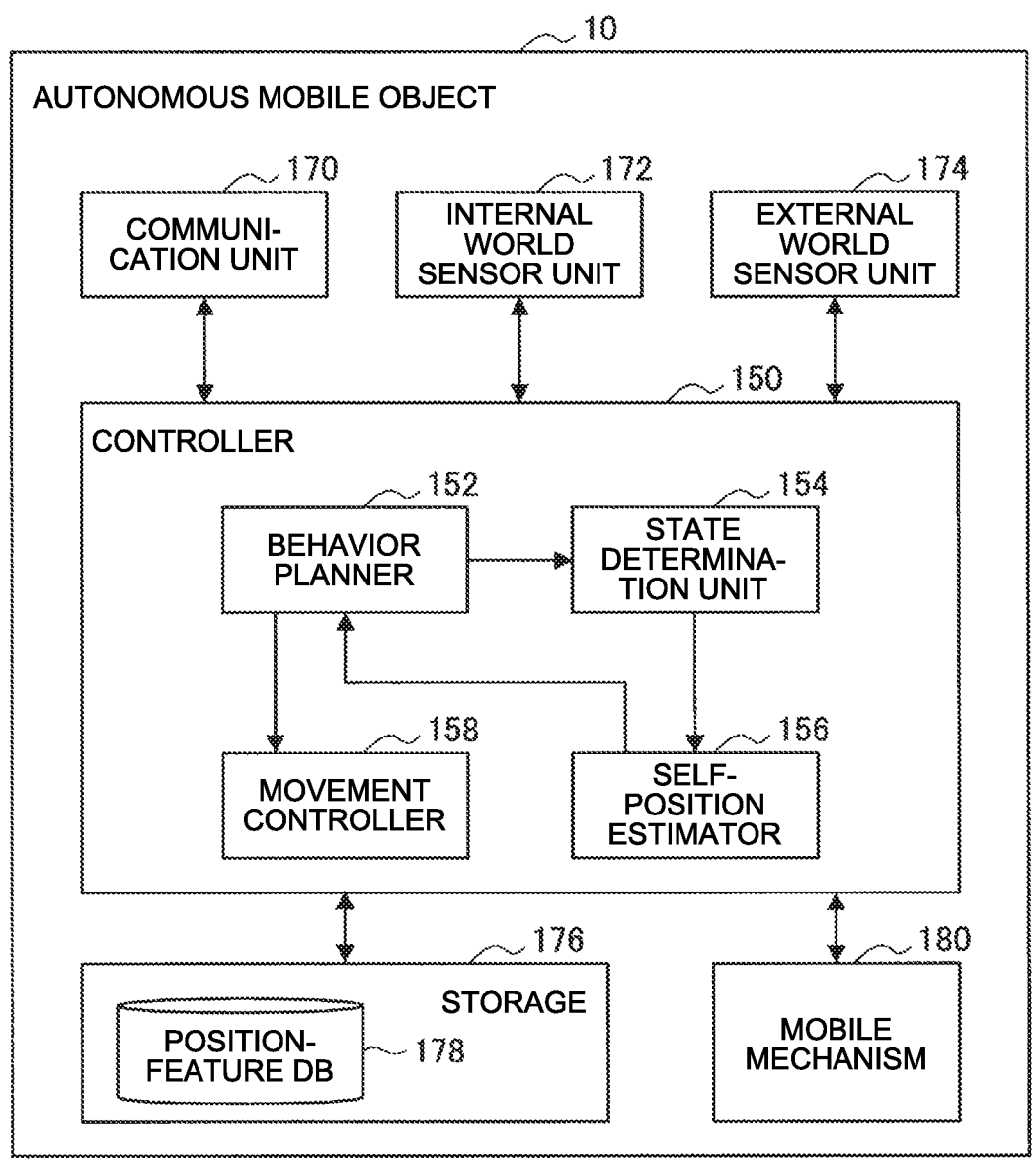
FIG. 2 is a block diagram illustrating an exemplary functional configuration of the autonomous mobile object 10 according to the embodiment.

First of all, a functional configuration of the autonomous mobile object 10 according to the embodiment will be described. FIG. 2 is a block diagram illustrating an exemplary functional configuration of the autonomous mobile object 10. As illustrated in FIG. 2, the autonomous mobile object 10 includes the controller 150, a communication unit 170, the internal world sensor unit 172, the external world sensor unit 174, a storage 176, and the mobile mechanism 180. The same content of the description given above will not be described.

2-1-1. Controller 150

The controller 150 is, for example, configured by including a CPU, a GPU (Graphics Processing Unit) and/or a processing circuit, such as a NPU (Neural Network Processing Unit). The controller 150 overall controls operations of the autonomous mobile object 10. As illustrated in FIG. 2, the controller 150 includes a behavior planner 152, a state determination unit 154, a self-position estimator 156, and the movement controller 158.

2-1-2. Behavior Planner 152

The behavior planner 152 plans a behavior of the autonomous mobile object 10 based on the result of sensing internal world information by the internal world sensor unit 172, the result of sensing external world information by the external world sensor unit 174, or information on operations of the user that is received via the communication unit 170.

2-1-2-1. Planning Stop Condition

For example, the behavior planner 152 plans changing the state of the autonomous mobile object 10 between the moving state and the stopped state. For example, the behavior planner 152 plans a stop condition for changing the state of the autonomous mobile object 10 from the moving state to the stopped state.

For example, each time the autonomous mobile object 10 continuously moves a given distance, the behavior planner 152 can plan the stop condition such that the state of the autonomous mobile object 10 is changed from the moving state to the stopped state sequentially. The magnitude of the given distance (which is sometimes referred to as a continuous moving distance below) may be changed, for example, in realtime according to the condition of the ground on which the autonomous mobile object 10 is moving. For example, each time a result of sensing internal world information is acquired by the internal world sensor unit 172 while the state of the autonomous mobile object 10 is the moving state, the behavior planner 152 may sequentially specify the condition of the ground during the moving based on the result of sensing internal world information that is acquire at that timing and sequentially change the continuous moving distance according to the specified condition of the ground. The condition of the ground can include, for example, slipperiness of the ground, the degree of unevenness of the ground or the degree of inclination of the ground. For example, when the slipperiness of the ground on which the autonomous mobile object 10 is moving is at or above a given threshold, the behavior planner 152 may set the value of the continuous moving distance at a value smaller than a standard value. When the ground on which the autonomous mobile object 10 is moving has more unevenness than a given threshold, the behavior planner 152 may set the value of the continuous moving distance at a value smaller than the standard value. When the degree of inclination of the ground on which the autonomous mobile object 10 is moving is larger than a given threshold, the behavior planner 152 may set the value of the continuous moving distance at a value smaller than the standard value.

Alternatively, the behavior planner 152 may plan the stop condition such that the state of the autonomous mobile object 10 is changed from the moving state to the stopped state in any one location (position) in an area of which image is captured in at least one of multiple key frames that are stored in a position-feature DB 178 to be described below. Although details will be given below, in the position-feature DB 178, key frames obtained by previously capturing images respectively in multiple locations in the real space and sets of positional information of the locations are stored in association with each other.

Alternatively, the behavior planner 152 may plan the stop condition such that, each time the autonomous mobile object 10 continuously moves for a given duration, the state of the autonomous mobile object 10 is changed from the moving state to the stopped state sequentially.

Alternatively, the behavior planner 152 may plan the stop condition such that the state of the autonomous mobile object 10 is changed from the moving state to the stopped state using a combination of at least two of the above-described three types of planning methods.

2-1-2-2. Planning Moving Path

Furthermore, the behavior planner 152 is able to plan a moving path on which the autonomous mobile object 10 moves according to a destination of the autonomous mobile object 10 and a self-position that is estimated by the self-position estimator 156 to be described below. For example, before the autonomous mobile object 10 starts moving (in other words, the autonomous mobile object 10 is positioned in a starting point), the behavior planner 152 plans a moving path of the autonomous mobile object based on the starting point, the destination of the autonomous mobile object 10 and a given path determination method. At each set of timing when the state of the autonomous mobile object 10 is changed from the moving state to the stopped state, the behavior planner 152 is able to replan a moving path of the autonomous mobile object after that timing based on a self-position that is estimated by the self-position estimator 156 at that timing, the destination of the autonomous mobile object 10, and the given path determination method. The given path determination method can be a method of planning a comprehensive moving path to the destination. For example, the given path determination method is a method using a graph searching algorithm, such as the A* (A-star) search algorithm.

Figure 3A:
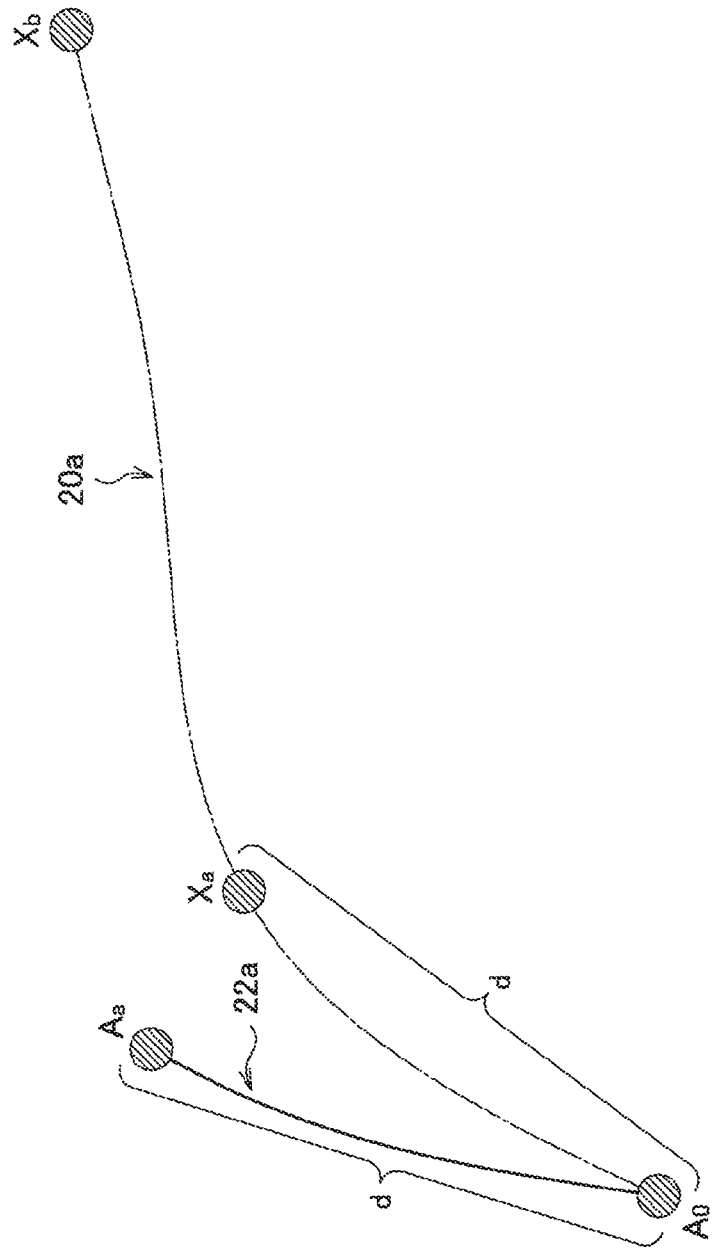
FIG. 3A is a diagram illustrating an example of determining a stop position according to the embodiment.

With reference to FIGS. 3A and 3B, the function of the behavior planner 152 described above will be described more in detail. FIG. 3A illustrates an example where the starting point of the autonomous mobile object 10 is "A0" and the destination of the autonomous mobile object 10 is set at "Xb". As illustrated in FIG. 3A, first of all, the behavior planner 152 plans a moving path 20a of the autonomous mobile object 10 (at the starting point) based on the starting point (A0), the destination (Xb), and the above-described given path determination method. Furthermore, the behavior planner 152 plans, as the stop condition, completing moving a given distance ("d" in the example illustrated in FIG. 3A). The behavior planner 152 may perform the planning using the same condition as every stop condition until the destination is reached or may sequentially plan the content of the next stop condition at every stop.

Thereafter, the autonomous mobile object 10 stops at the location ("Locations Aa" in the example illustrated in FIG. 3A) to which the autonomous mobile object 10 moves the given distance d based on the planned moving path 20a and the stop condition. At that timing, the behavior planner 152 then replans a moving path 20b of the autonomous mobile object 10 after that timing like that illustrated in FIG. 3B based on a self-position (Location Aa) that is estimated by the self-position estimator 156 to be described below, the destination (Xb), and the given path determination method. Thereafter, the above-described process can be repeated until the autonomous mobile object 10 reaches the destination Xb.

2-1-3. State Determination Unit 154

The state determination unit 154 determines whether the current state of the autonomous mobile object 10 is the moving state or the stopped state. For example, when it is specified that the speed of the autonomous mobile object 10 is continuously at or under a given threshold for a given duration based on a result of sensing by the internal world sensor unit 172, the state determination unit 154 determines that the state of the autonomous mobile object 10 is changed from the moving state to the stopped state. Alternatively, when the stop condition that is planned by the behavior planner 152 is met while the latest state of the autonomous mobile object 10 is the moving state, the state determination unit 154 may determine that the state of the autonomous mobile object 10 is changed from the moving state to the stopped state.

2-1-4. Self-position Estimator 156
2-1-4-1. Switching Estimation Method

The self-position estimator 156 estimates a self-positon of the autonomous mobile object 10 based on a result of determination by the state determination unit 154.

Figure 4:
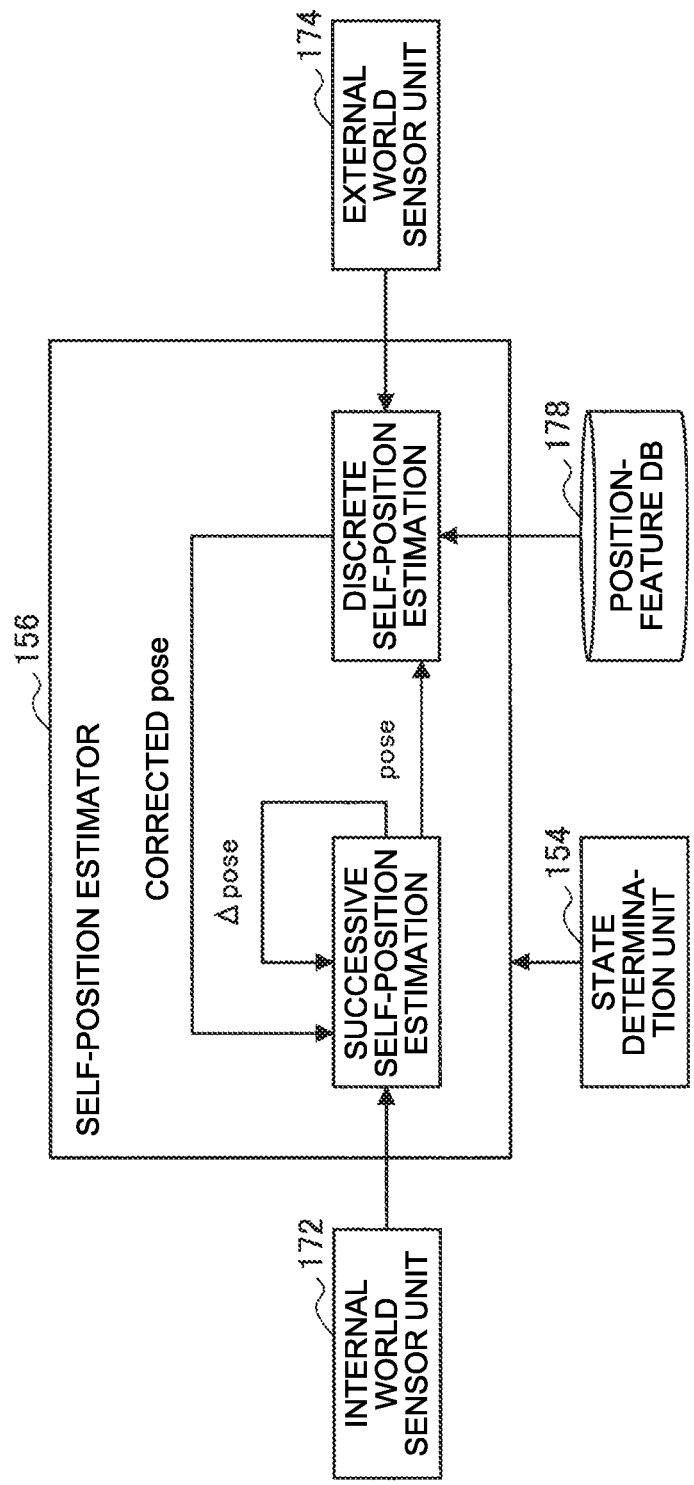
FIG. 4 is a diagram schematically illustrating a flow of a function of a self-position estimator 156 according to the embodiment.

FIG. 4 is a diagram schematically illustrating a flow of a function of the self-position estimator 156 according to the embodiment. As illustrated in FIG. 4, based on the result of determining by the state determination unit 154, the self-position estimator 156 determines which of the successive self-position estimation using a result of sensing by the internal world sensor unit 172 and the disperse self-position estimation using the result of sensing by the external world sensor unit 174. For example, the self-position estimator 156 determines to estimate a self-position using the successive self-position estimation while the state determination unit 154 determines that the state of the autonomous mobile object 10 is not the stopped state (in other words, while it is determined that the state is the moving state). When the state determination unit 154 determines that the state of the autonomous mobile object 10 has turned into the stopped state, the self-position estimator 156 determines to estimate a self-position using the discrete self-position estimation. In other words, when the state of the autonomous mobile object 10 is changed from the moving state to the stopped state, the self-position estimator 156 switches the method of estimating a self-position from the successive self-position estimation to the discrete self-position estimation. When the state of the autonomous mobile object 10 is changed from the stopped state to the moving state, the self-position estimator 156 switches the method of estimating a self-position from the discrete self-position estimation to the successive self-position estimation.

With reference to FIG. 5, the content of each of the successive self-position estimation and the discrete self-position estimation will be described below in detail. FIG. 5 is an explanatory table representing the difference between the successive self-position estimation and the discrete self-estimation estimation.

Successive Self-Position Estimation

The successive self-estimation can be a method of estimating a self-position of the autonomous mobile object 10 by integrating the results of sensing internal world information by the internal world sensor unit 172 at respective sets of sensing timing until now. For example, as illustrated in FIG. 5, the internal world sensor unit 172 can be configured to sense (measure) at least one physical quantity (for example, the speed of the autonomous mobile object 10, the acceleration of the autonomous mobile object 10, the relative position of the autonomous mobile object 10, or the acceleration of the autonomous mobile object 10) periodically. In this case, the successive self-position estimation may be a method of periodically estimating a self-position of the autonomous mobile object 10 (for example, the absolute position and the posture of the autonomous mobile object 10) by periodically integrating the result of sensing these types of physical quantity by the internal world sensor unit 172.

For example, at least one encoder (which is an example of the internal world sensor unit 172) can be arranged in each joint in the autonomous mobile object 10. In this case, the "successive self-positon estimation" may be a method of estimating a self-position of the autonomous mobile object 10 periodically using existing successive dynamics computation (for example, dead reckoning or odometry) using the angle of each joint that is sensed periodically by the encoder in the joint and geometric information on the autonomous mobile object 10 that is stored in, for example, the storage 176.

Discrete Self-Position Estimation

The discrete self-position estimation can be a method of estimating a self-positon of the autonomous mobile object 10 using the result of sensing external world information by the external world sensor unit 174 at one set of sensing timing. For example, as illustrated in FIG. 5, the discrete self-position estimation may be a method of directly calculating an absolute position and a posture of the autonomous mobile object 10 using the result of sensing external world information by the external world sensor unit 174 at one set of sensing timing and making an estimation using the result of the calculation as the self-position of the autonomous mobile object 10.

The content of the "discrete self-position estimation" will be further described in detail. For example, the discrete self-position estimation may be a method of, first of all, collating an image that is captured by the imaging unit (for example, a fisheye camera) included by the external world sensor unit 174 at the timing when the autonomous mobile object 10 stops and the multiple key frames that are stored in the position-feature DB 178 and then estimating a self-position using positional information that is associated with a key frame whose corresponding result of collating meets a given condition. For example, at the timing when the autonomous mobile object 10 changes from the moving state to the stopped state, first of all, the self-position estimator 156 performs matching between (collates) an image that is captured by the imaging unit at that timing and each of the multiple key frames. The self-position estimator 156 then specifies a key frame with the best matching result. The self-position estimator 156 may then estimate a self-position of the autonomous mobile object 10 based on the result of matching the specified key frame and the captured image and the positional information that is associated with the specified key frame.

The discrete self-estimation is not limited to the method of matching an image captured by the imaging unit (for example, matching feature points between images). For example, the discrete self-estimation may be a method of estimating a self-position by matching point cloud data that is acquired previously and a result of sensing by a depth sensor, LIDAR, or the like.

2-1-4-2. Correcting Self-position

As described above, because the successive self-position estimation is a method of integrating the results of sensing internal world information, a cumulative error occurs in general according to the move of the autonomous mobile object 10. For example, when the autonomous mobile object 10 estimates a self-position using only the successive self-position estimation, as the autonomous mobile object 10 continues moving based on the estimated self-position, the cumulative error may gradually increase. For this reason, the volume of shift between the estimated self-position and the real positional information of the autonomous mobile object 10 can gradually increase.

Because of such background, when estimating a self-position using the discrete self-position estimation, the self-position estimator 156 can correct the self-position that is estimated using the successive self-position estimation until that timing based on the result of estimating a self-position using the discrete self-position estimation. For example, as illustrated in FIG. 4, each time the self-position estimator 156 estimates a self-position using the discrete self-positon estimation, the self-position estimator 156 discards the self-position that is estimated using the successive self-position estimation until that timing and employs the self-position that is estimated using the discrete self-position estimation at that timing as the self-position at that timing, thereby performing the above-described correction.

As described above, the discrete self-position estimation enables accurate calculation of an absolute position and a posture. Accordingly, performing the above-described correction makes it possible to accordingly cancel the cumulative error based on the successive self-position estimation each time.

Figure 6:
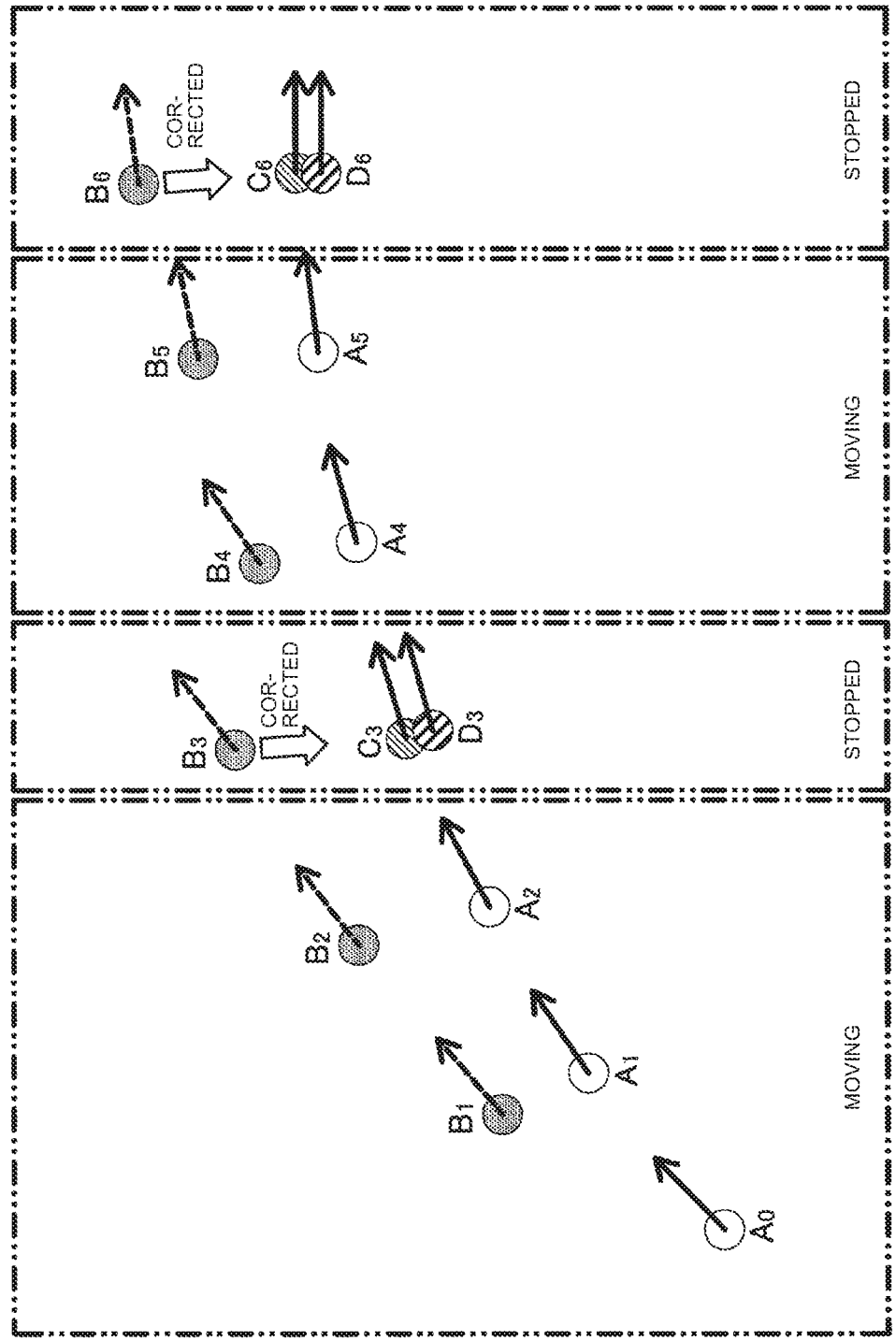
FIG. 6 is a diagram illustrating an example of switching the self-position estimation method according to the embodiment.

With reference to FIG. 6, the above-described function will be described more in detail. FIG. 6 is a diagram illustrating an example of switching the self-position estimation method while the autonomous mobile object 10 moves to the destination. In the example illustrated in FIG. 6, "A" denotes each of target positions (true values) of the autonomous mobile object 10 at respective sets of timing on the moving path of the autonomous mobile object 10. "B" denotes each of self-positions (measured values) that are estimated using the successive self-position estimation at the sets of timing. "C" denotes each of self-positions (measured values) that are estimated at the sets of timing for the sets of timing when the autonomous mobile object 10 uses the discrete self-position estimation. "D" denotes each of target positions (true values) of the autonomous mobile object 10 at the sets of timing represented by "C" on the moving path of the autonomous mobile object 10.

As illustrated in FIG. 6, the autonomous mobile object 10 can continuously move from a starting point (A0) based on a moving path that is planned previously while estimating a self-position using the successive self-position estimation. In this case, the volume of shift (cumulative error) from the moving path increases like "B1", "B2" and "B3" illustrated in FIG. 6 as the distance that the autonomous mobile object 10 has moved increases. It is assumed that the state of the autonomous mobile object 10 changes from the moving state to the stopped state at the timing corresponding to "B3" illustrated in FIG. 6. In this case, as illustrated in FIG. 6, the self-position estimator 156 switches the method of estimating a self-position from the successive self-position estimation to the discrete self-position estimation. Specifically, first of all, the self-position estimator 156 estimates a self-position using the result of sensing external world information by the external world sensor unit 174 at that timing and the discrete self-position estimation. The self-position estimator 156 employs the estimated self-position (that is, "C3" illustrated in FIG. 6) instead of the self-position (that is, "B3" illustrated in FIG. 6) that is previously estimated using the successive self-position estimation, thereby correcting the self-position. Accordingly, the cumulative error until that timing is canceled. Thereafter, when the autonomous mobile object 10 restarts moving based on the moving path that is planned previously, the autonomous mobile object 10 moves to the destination while switching the method of estimating a self-position as described above.

2-1-5. Movement Controller 158

The movement controller 158 controls movement (such as moving) of the autonomous mobile object 10 based on the behavior plan that is planned by the behavior planner 152. For example, the movement controller 158 controls the mobile mechanism 180 such that the autonomous mobile object 10 moves based on the latest moving path that is planned by the behavior planner 152 and the previous self-position that is estimated by the self-position estimator 156.

The movement controller 158 controls the mobile mechanism 180 such that the state of the autonomous mobile object 10 changes from the moving state to the stopped state at the timing when the stop condition that is planned by the behavior planner 152 is met while the state of the autonomous mobile object 10 is the moving state.

In the example illustrated in FIG. 3A, the movement controller 158 controls the mobile mechanism 180 such that that moving starts at the starting point A0. The movement controller 158 controls the mobile mechanism 180 such that moving is stopped at the timing when the stop condition that is planned by the behavior planner 152 is met (that is, the timing when moving only the distance "d" is performed).

2-1-6. Communication Unit 170

The communication unit 170 is, for example, configured by including a communication interface, such as a network card or an antenna. The communication unit 170, for example, transmits and receives information to and from an external device via a network, such as the Internet or a public network. For example, the communication unit 170 receives information on an operation of the user from the external device.

2-1-7. Storage 176

The storage 176 is, for example, configured by including a memory (such as RAM (Random Access Memory) or a ROM (Read Only Memory)) and a storage device, such as an HDD (Hard Disk Drive). The storage 176 stores, for example, various types of data, such as the position-feature DB 178, and various types of software.

2-2. Process Flow

Figure 7:
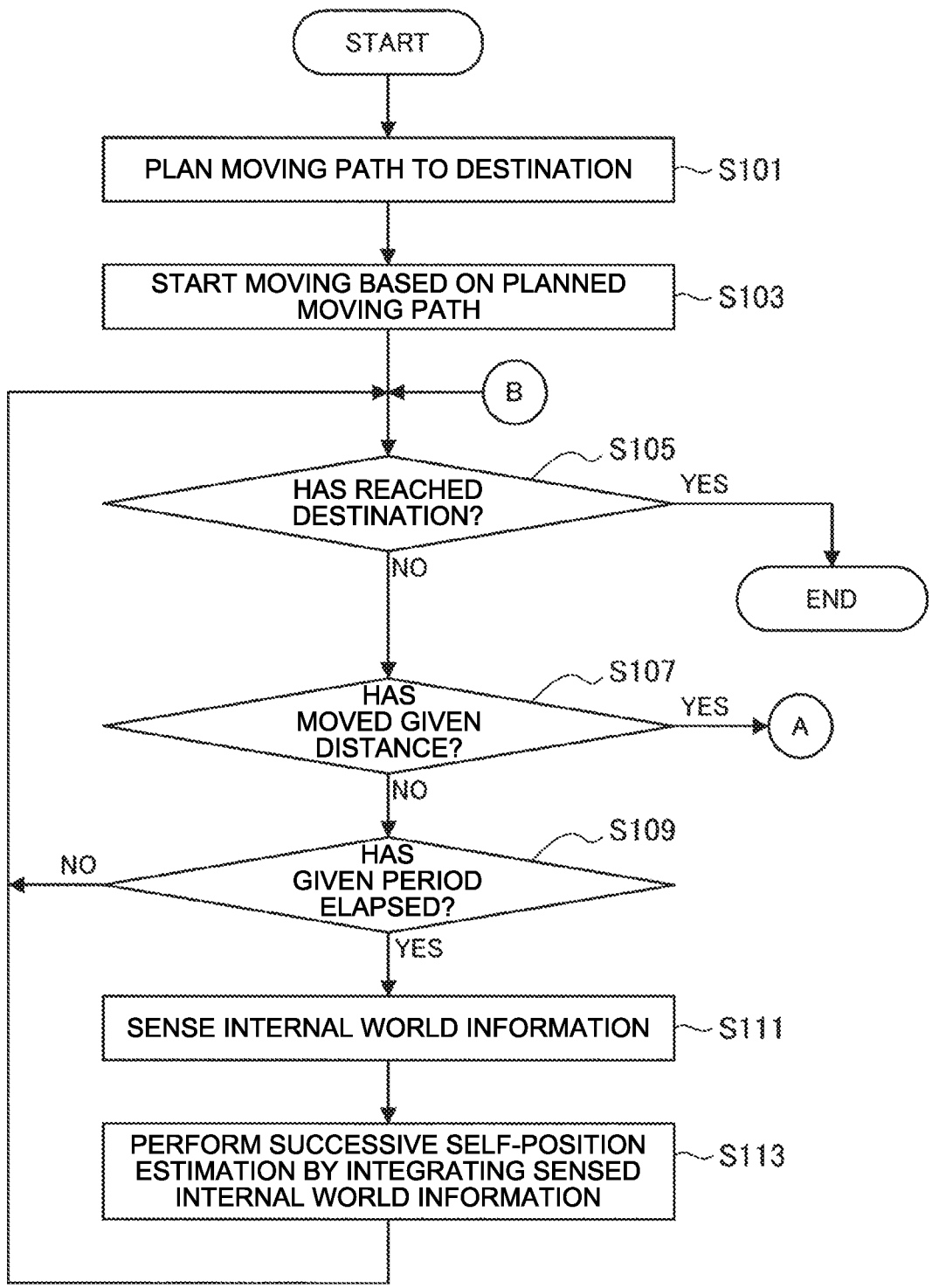
FIG. 7 is a flowchart illustrating part of a process flow according to the embodiment.

The functional configuration of the autonomous mobile object 10 has been described. A process flow according to the embodiment will be described next. FIGS. 7 and 8 are flowcharts each illustrating the process flow according to the embodiment. The example in which the autonomous mobile object 10 is positioned at a starting point and moves to a destination will be described. Completing moving a given distance is determined as the stop condition here.

As illustrated in FIG. 7, first of all, the behavior planner 152 of the autonomous mobile object 10 plans a moving path of the autonomous mobile object 10 based on positional information of the starting point, positional information of the destination, and a given path determination method (S101).

The movement controller 158 then controls the mobile mechanism 180 such that the autonomous mobile object 10 starts moving and moves based on the planned moving path that is planned at S101 (S103).

Thereafter, unless the autonomous mobile object 10 has reached the destination (NO at step S105), the autonomous mobile object 10 repeats the following process from S107 to S113. When the autonomous mobile object 10 has reached the destination (S105: YES), the process flow ends.

Specifically, first of all, the controller 150 of the autonomous mobile object 10 determines whether the autonomous mobile object 10 has moved the given distance. Note that when the autonomous mobile object 10 had moved the distance at least once, the controller 150 determines whether the autonomous mobile object 10 has moved the given distance from the previous timing when the autonomous mobile object 10 stops (S107).

Unless the distance that the autonomous mobile object 10 has moved has reached the given distance (S107: NO), the self-position estimator 156 determines whether a given period corresponding to the successive self-position estimation has elapsed. For example, when the given period had elapsed at least once, the self-position estimator 156 determines whether the given period has elapsed from the previous timing when the given interval elapses (S109). When it is determined that the given period has not elapsed (S109: NO), the autonomous mobile object 10 performs the process at and after S105 again.

When it is determined that the given period has elapsed (S109: NO), first of all, the internal world sensor unit 172 senses internal world information in relation to the autonomous mobile object 10 (S111). The self-position estimator 156 then estimates a self-position of the autonomous mobile object 10 by using the successive self-position estimation (that is, integrating the results of sensing internal world information until now) (S113).

The autonomous mobile object 10 then performs the process at and after S105 again.

The process flow in the case where the distance that the autonomous mobile object 10 has moved has reached the given distance (S107: YES) will be described with reference to FIG. 8. As illustrated in FIG. 8, when the distance that the autonomous mobile object 10 has moved has reached the given distance (S107: YES), the movement controller 158 determines that the stop condition is met and controls the mobile mechanism 180 such that the state of the autonomous mobile object 10 changes from the moving state to the stopped state (S121).

The external world sensor unit 174 the senses external world information in relation to the autonomous mobile object 10 (S123).

The self-position estimator 156 estimates a self-position by performing the discrete self-position estimation using the external world information that is sensed at S123 (S125).

Based on the self-position that is estimated at S125, the self-position estimator 156 corrects the self-position that is estimated using the successive self-position estimation previously to that timing (S127).

The behavior planner 152 then replans a moving path of the autonomous mobile object 10 based on the self-position that is estimated at S125, the positional information of the destination, and the given path determination method (S129).

Thereafter, the movement controller 158 controls the mobile mechanism 180 such that the autonomous mobile object 10 restarts moving and moves based on the moving path that is replanned at S129 (S131).

The autonomous mobile object 10 then performs the process at and after S105 again.

2-2-1. Modification

In the description given above, the example in which, the controller 150 determines whether the head 100 has moved the given distance at S107 is described; however, the embodiment is not limited to the example. For example, at S107, the controller 150 may determine whether the autonomous mobile object 10 has moved continuously for a given duration. In this case, when the autonomous mobile object 10 has moved continuously for the given duration (S107: YES), the controller 150 can perform the process at and after S121. On the other hand, the controller 150 can perform the process at and after S109 while the duration in which the autonomous mobile object 10 has moved continuously is under a given duration (S107: NO).

2-3. Effect 2-3-1. Effect

As described above, when estimating a self-position, the autonomous mobile object 10 according to the embodiment determines which of the successive self-position estimation using a result of sensing by the internal world sensor unit 172 and the disperse self-position estimation using a result of sensing by the external world sensor unit 174 is used based on whether the state of the autonomous mobile object 10 is the stopped state. This makes it possible to estimate a self-position more appropriately when the autonomous mobile object 10 repeats the stopped state and the moving state.

For example, unless the state of the autonomous mobile object 10 is the stopped state (that is, when the state is the moving state), the autonomous mobile object 10 estimates a self-position periodically using the successive self-position estimation. Only when the state of the autonomous mobile object 10 turns into the stopped state, the autonomous mobile object 10 estimates a self-position using the discrete self-positon estimation. Accordingly, it is possible to regularly correct the cumulative error caused by the successive self-position estimation using the discrete self-position estimation.

For example, when the autonomous mobile object 10 moves indoors, even when a sensor (for example, a GPS) capable of capturing an absolute position and a posture is used, in general, accuracy of the sensor value that can be acquired can lower and thus there is a great risk that the autonomous mobile object 10 is unable to specify an absolute positon and a posture. The autonomous mobile object 10 uses the discrete self-position estimation described above instead of using such a sensor and this makes it possible to specify an accurate self-position even when the autonomous mobile object 10 moves indoors. Compared with the outdoors, for example, roads, problems tend not to occur in the indoors even when the autonomous mobile object 10 regularly stops and thus the autonomous mobile object 10 is able to regularly use the discrete self-position estimation.

2-3-2. Effect 2

FIG. 9 is a table representing a difference between the moving state and the stopped state. As illustrated in FIG. 9, in general, in the moving state, trace tracking is necessary and the CPU utilization can increase. For example, in the moving state, the autonomous mobile object 10 is required to move while avoiding obstacles and accordingly the CPU utilization increases. On the other hand, in the stopped state, trace tracking is unnecessary and the CPU utilization can be low.

The autonomous mobile object 10 according to the embodiment switches the method of estimating a self-position as described above and thus is able to acquire a self-positon successively using the successive self-positon estimation while moving. Accordingly, the autonomous mobile object 10 easily tracks a planned trace.

The discrete self-positon estimation is used during the stop and accordingly an accurate result of sensing in which, for example, blurs tend not to occur in images captured by the imaging unit can be acquired by the external world sensor unit 174. Thus, accuracy of estimating a self-position based on the discrete self-position estimation can improve. Note that the result of estimating a self-position by the discrete self-position estimation can be not successive (discrete). Any particular problem however occurs because the autonomous mobile object 10 uses the discrete self-position estimation while being stopped.

2-3-3. Effect 3

Figures 10, 11A:
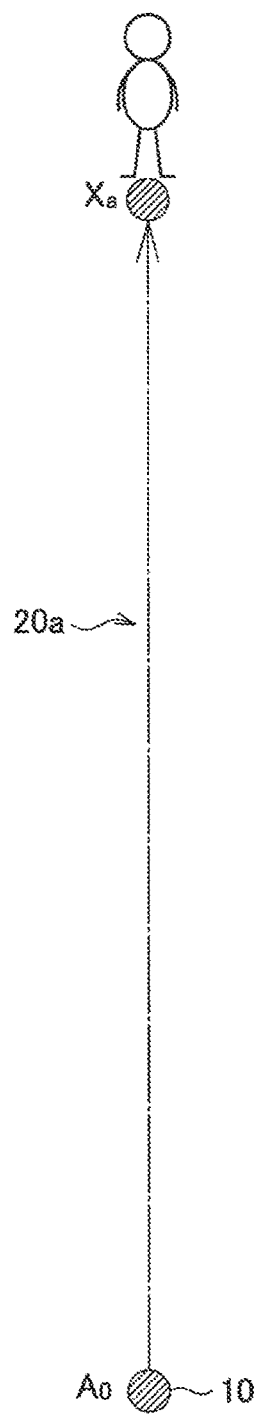
FIG. 10 is a table representing a difference between two types of self-position estimation method according to the embodiment.
FIG. 11A is a diagram for explaining an example of determining a moving path according to Application Example 1 of the embodiment.

FIG. 10 is another table representing a difference between the successive self-position estimation and the discrete self-position estimation according to the embodiment. For the discrete self-position estimation, it is necessary to use a large volume of data, for example, images and point cloud data. For this reason, as illustrated in FIG. 10, in general, the CPU utilization is higher in the discrete self-position estimation than in the successive self-position estimation. According to the embodiment, the autonomous mobile object 10 uses the discrete self-position estimation while being stopped (the CPU utilization associated with the behavior control is low), which makes it possible to optimize the balance between the two sets of process intensiveness between self-position estimation and behavior control.

Application Examples

The embodiment is not limited to the above-described example. Application examples according to the embodiment will be described in "3-1. Application Example 1" and "3-2. Application Example 2". The components included in the autonomous mobile object 10 according to the application examples are the same as those in the example illustrated in FIG. 2. Only components having functions different from those of the above-described embodiment will be described below and description of components having the same functions will be described.

3-1. Application Example 1

First of all, Application Example 1 will be described. In Application Example 1, it is assumed that the autonomous mobile object 10 tracks in a room a given mobile object (for example, a person) that is mobile in the room. The example in which the given mobile object is a "person" will be mainly described. In Application Example 1, it can be assumed that a location within a given distance from a location in which the corresponding person is positioned is set for a destination of the autonomous mobile object 10.

3-3-1. Behavior Planner 152

At each set of timing when the state of the autonomous mobile object 10 is changed from the moving state to the stopped state, the behavior planner 152 according to Application Example 1 first of all specifies a location in which the person is positioned at the timing using external world information that is sensed by the external world sensor unit 174 at the timing. The behavior planner 152 then redetermines a destination of the autonomous mobile object 10 according to the location in which the person is positioned at the timing. The behavior planner 152 then replans a moving path of the autonomous mobile object 10 after the timing based on a self-position that is estimated at the timing using the discrete self-position estimation described above and the destination that is redetermined at the timing.

The above-described function will be described in detail with reference to FIG. 11A and FIG. 11B. For example, as illustrated in FIG. 11A, at the timing when the autonomous mobile object 10 is positioned at a starting point "A0", the behavior planner 152 first of all performs given recognition processing on an image that is captured by the external world sensor unit 174 at the timing, thereby specifying a location in which a target person to be tracked is positioned. The behavior planner 152 then determines a destination "Xa" of the autonomous mobile object 10 according to the location in which the target person is positioned. The behavior planner 152 then plans a moving path 20a of the autonomous mobile object 10 based on positional information of the destination "Xa" and a given path determination method. The autonomous mobile object 10 then starts moving based on the moving path 20a.

Figure 11B:
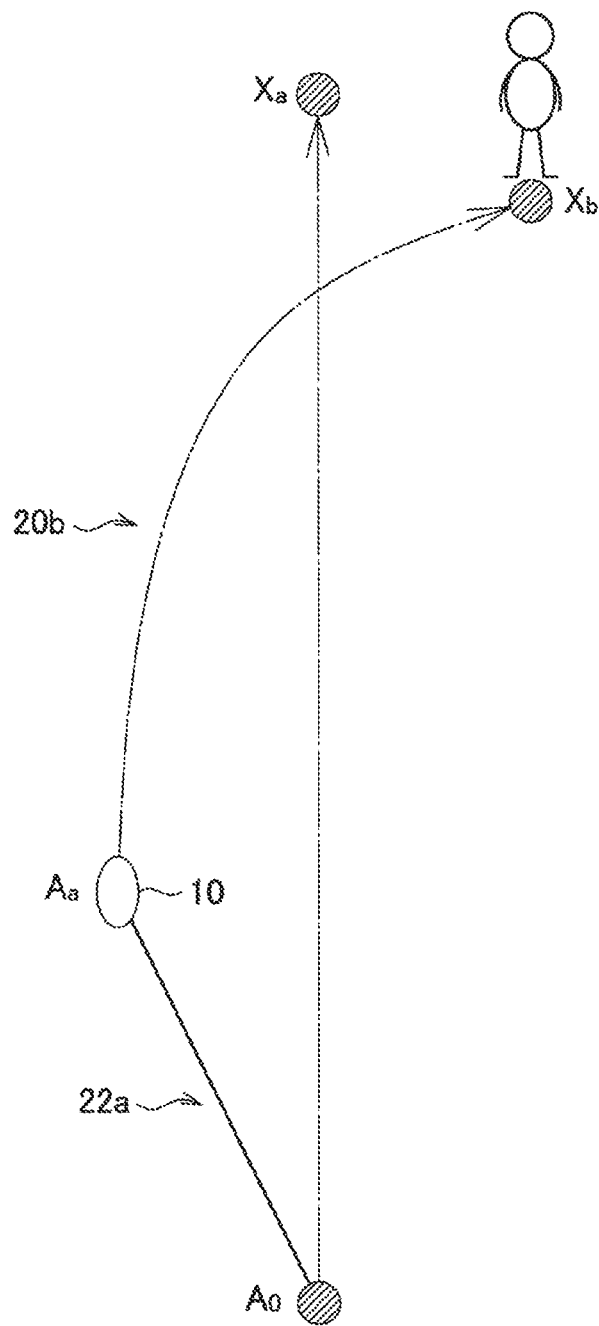
FIG. 11B is a diagram for explaining the example of determining a moving path according to Application Example 1 of the embodiment.

FIG. 11B is a diagram illustrating an example of planning a path of the autonomous mobile object 10 at the timing when a stop condition (for example, completion of moving a given distance) is met after the timing illustrated in FIG. 11A. As illustrated in FIG. 11B, at the timing when the autonomous mobile object 10 stops, first of all, the above-described recognition processing is performed on an image that is captured at the timing by the external world sensor unit 174 of the autonomous mobile object 10 and accordingly a location in which the target person is positioned is newly specified. The behavior planner 152 then redetermines a destination of the autonomous mobile object 10 at "Xb" (instead of "Xa") according to the newly-specified location in which the target person is positioned. The behavior planner 152 then replans a moving path 20b of the autonomous mobile object 10 based on a self-position ("Aa" in the example illustrated in FIG. 11B) that is estimated by the above-described discrete self-position estimation at the timing, positional information of the redetermined destination "Xb", and the given path determination method. The autonomous mobile object 10 then restarts moving based on the replanned moving path 20b.

3-1-2. Process Flow

Figure 12:
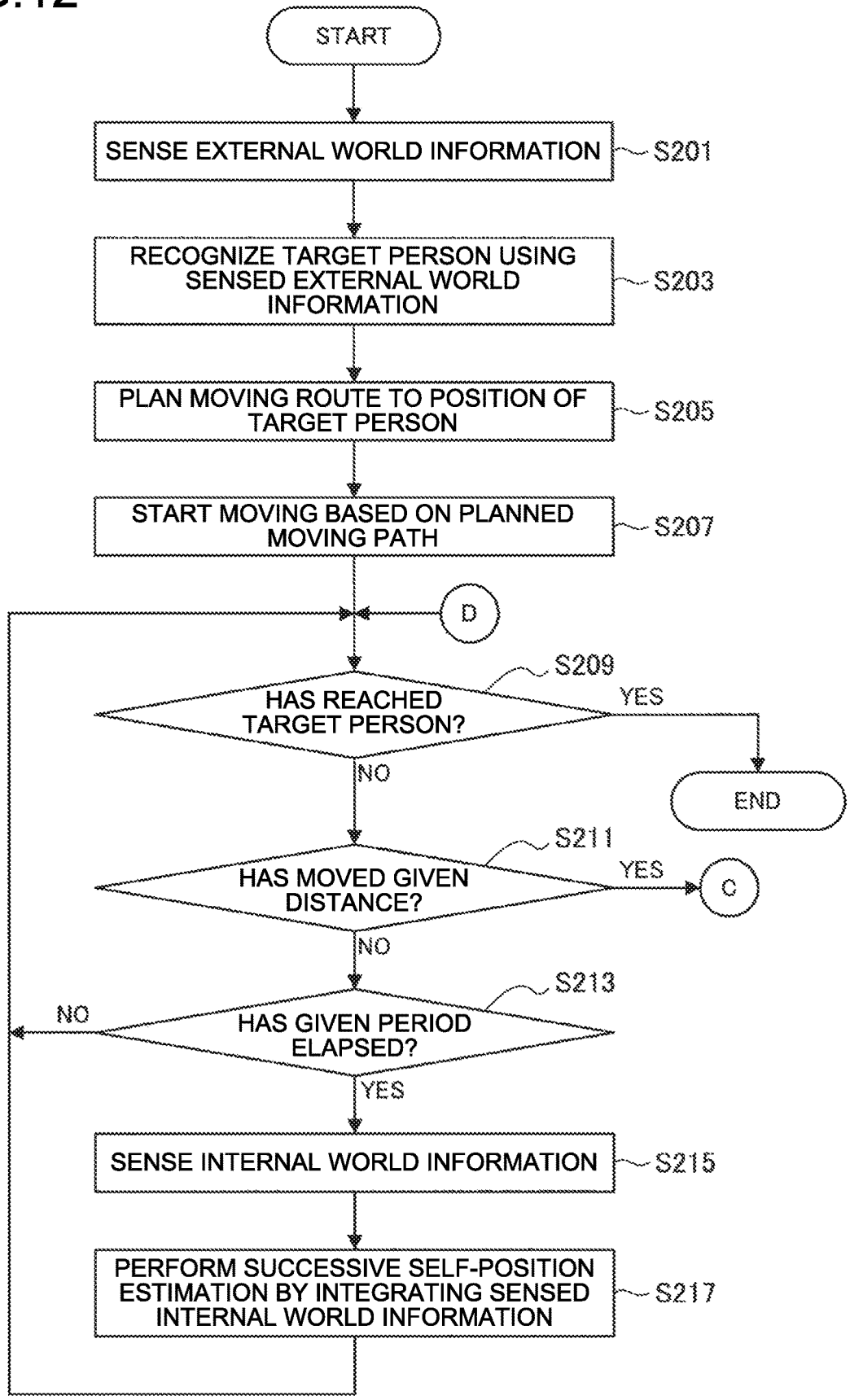
FIG. 12 is a flowchart illustrating part of the process flow according to Application Example 1 of the embodiment.
Figure 13:
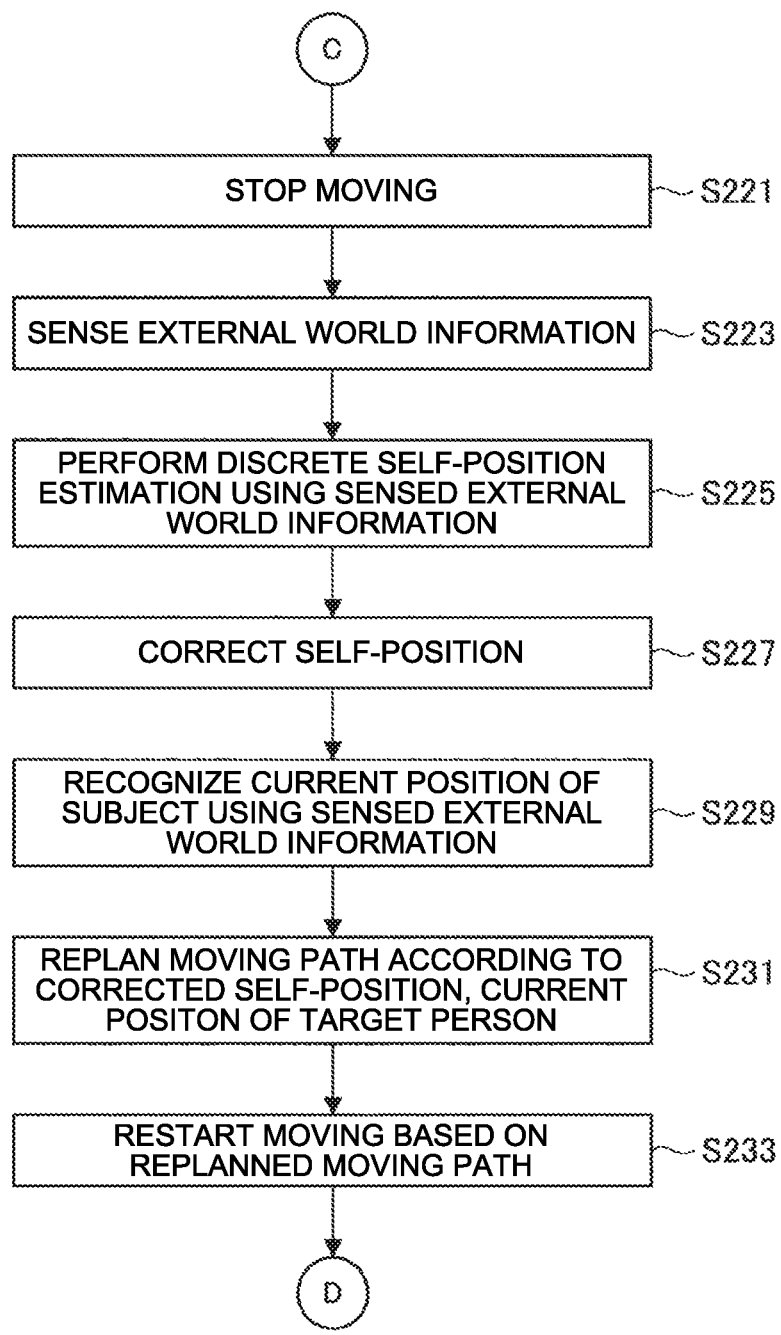
FIG. 13 is a flowchart illustrating part of the process flow according to Application Example 1 of the embodiment.

A process flow according to Application Example 1 will be described with reference to FIGS. 12 and 13. FIGS. 12 and 13 are flowcharts each illustrating part of the process flow according to Application Example 1. The example in which the autonomous mobile object 10 is positioned at a starting point and moves to a location (destination) in which a target person to be tracked is positioned will be described. Completion of moving a given distance is determined as the stop condition here.

As illustrated in FIG. 12, first of all, the external world sensor unit 174 of the autonomous mobile object 10 senses external world information (S201).

The behavior planner 152 then recognize the target person to be tracked using the external world information (such as a captured image) that is sensed at S201 and thereby specifies a location in which the target person is positioned (S203).

The behavior planner 152 then determines, as a destination, a position near the location that is specified at S203. The behavior planner 152 then plans a moving path of the autonomous mobile object 10 based on positional information of the starting point, positional information of the determined destination, and a given path determination method (S205).

The movement controller 158 then controls the mobile mechanism 180 such that the autonomous mobile object 10 starts moving and moves based on the moving path that is planned at S203 (S207).

Thereafter, when the autonomous mobile object 10 has reached the (currently-set) destination (S209: YES), the process flow ends. On the other hand, unless the autonomous mobile object 10 has reached the destination (S209: NO), the autonomous mobile object 10 repeats the process from S211 to S217. Note that S211 to S217 illustrated in FIG. 12 are schematically the same as S107 to S113 illustrated in FIG. 7.

The process flow in the case where the distance that the autonomous mobile object 10 has moved has reached the given distance at S211 (S211: YES) will be described with reference to FIG. 13. S221 to S227 illustrated in FIG. 13 are schematically the same as S121 to S127 illustrated in FIG. 8.

As illustrated in FIG. 13, after S227, the behavior planner 152 recognizes the target person to be traced using the external world information (such as a captured image) that is sensed at S223 and thereby specifies a location in which the target person is currently positioned (S229).

The behavior planner 152 redetermines, as a destination, a position near the location that is specified at S229. The behavior planner 152 replans a moving path of the autonomous mobile object 10 based on the self-position that is estimated at S225, positional information of the redetermined destination, and the given path determination method (S231).

The process at and after S233 illustrated in FIG. 13 is schematically the same as the process at and after S131 illustrated in FIG. 8.

3-2. Application Example 2

Figure 14A:
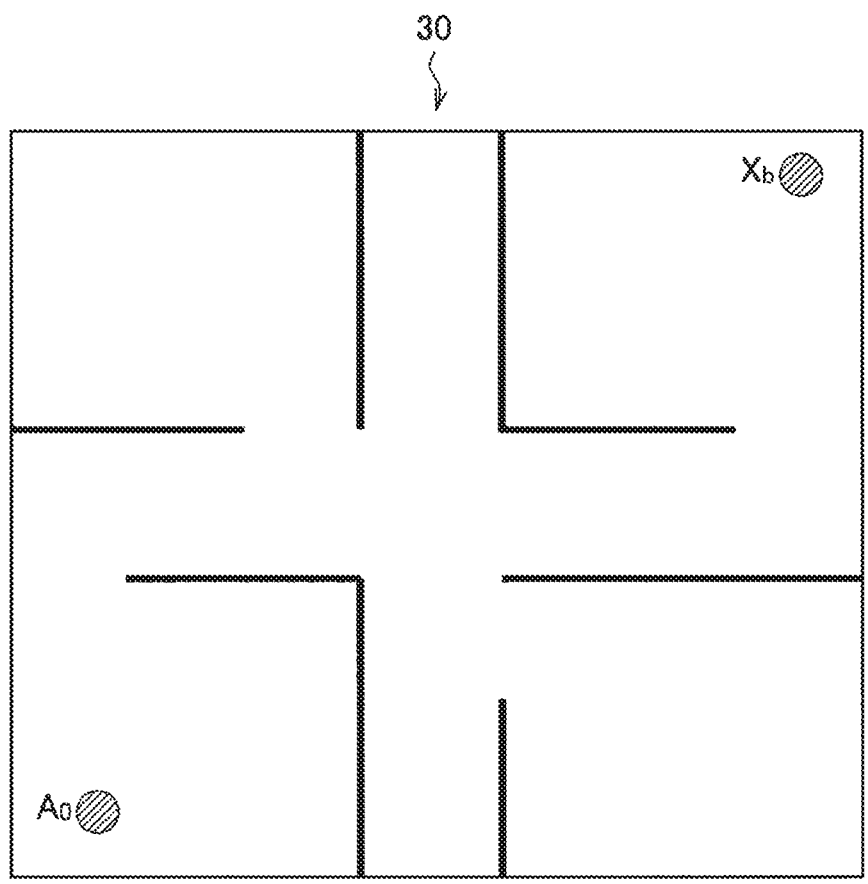
FIG. 14A is a diagram for explaining an example of determining a moving path according to Application Example 2 of the embodiment.

Application Example 1 has been described. Application Example 2 according to the embodiment will be described next. In Application Example 2, the scene where the autonomous mobile object 10 is positioned in a building with at least one room is assumed. In Application Example 2, the scene where the autonomous mobile object 10 moves from a starting point in the building to a destination that is final (which is sometimes referred to as a final destination below) in the building is assumed. For example, the scene where, as illustrated in FIG. 14A, the starting point and the final destination are separated, for example, are positioned respectively in different rooms is assumed. Furthermore, in Application example 2, it is assumed that the autonomous mobile object 10 reaches the final destination via at least one intermediate destination.

3-2-1. Behavior Planner 152

When a self-position of the autonomous mobile object 10 is estimated using the discrete self-position estimation, the behavior planner 152 according to Application Example 2 can determine, as the next destination (that is, the next intermediate destination), any one location in an area of which image is captured in one key frame that is used to estimate the self-position at that timing among the multiple key frames that are stored in the position-feature DB 178 based on the final destination of the autonomous mobile object 10.

Figure 14B:
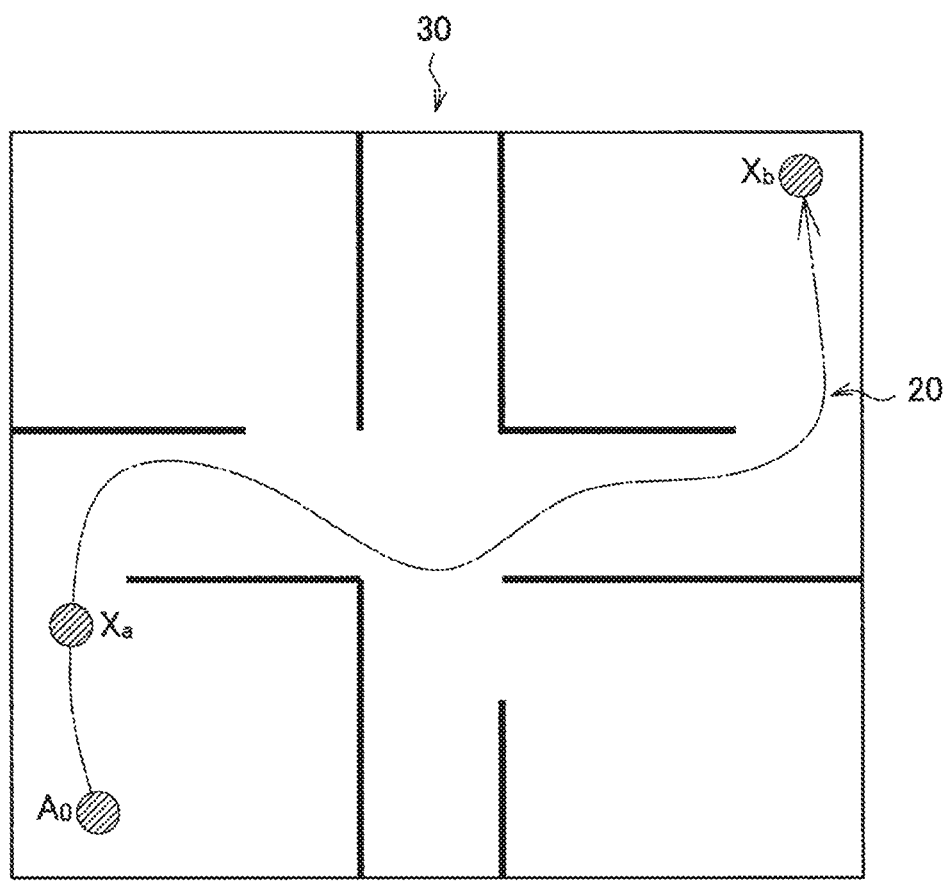
FIG. 14B is a diagram for explaining the example of determining a moving path according to Application Example 2 of the embodiment.

The above-described function will be described more in detail with reference to FIG. 14A and FIG. 14B. For example, at the timing when the autonomous mobile object 10 is positioned at a starting point "A0", the behavior planner 152 first of all plans a (comprehensive) moving path 20 of the autonomous mobile object 10 like that illustrated in FIG. 14B based on positional information of the starting point "A0", positional information of a final destination "Xb", and a given path determination method (for example, the A* search algorithm). For example, based on the planned moving path 20, the behavior planner 152 further determines, as the next destination ("Xa" in the example illustrated in FIG. 14B), any one position in a corresponding indoor image that is captured by the external world sensor unit 174 (for example, the fisheye camera 174f) at the starting point "A0". Thereafter, the autonomous mobile object 10 can move from the starting point "A0" to the next intermediate destination "Xa".

By repeating the above-described process, the autonomous mobile object 10 can move to the final destination "Xb".

3-2-2. Process Flow

Figure 16:
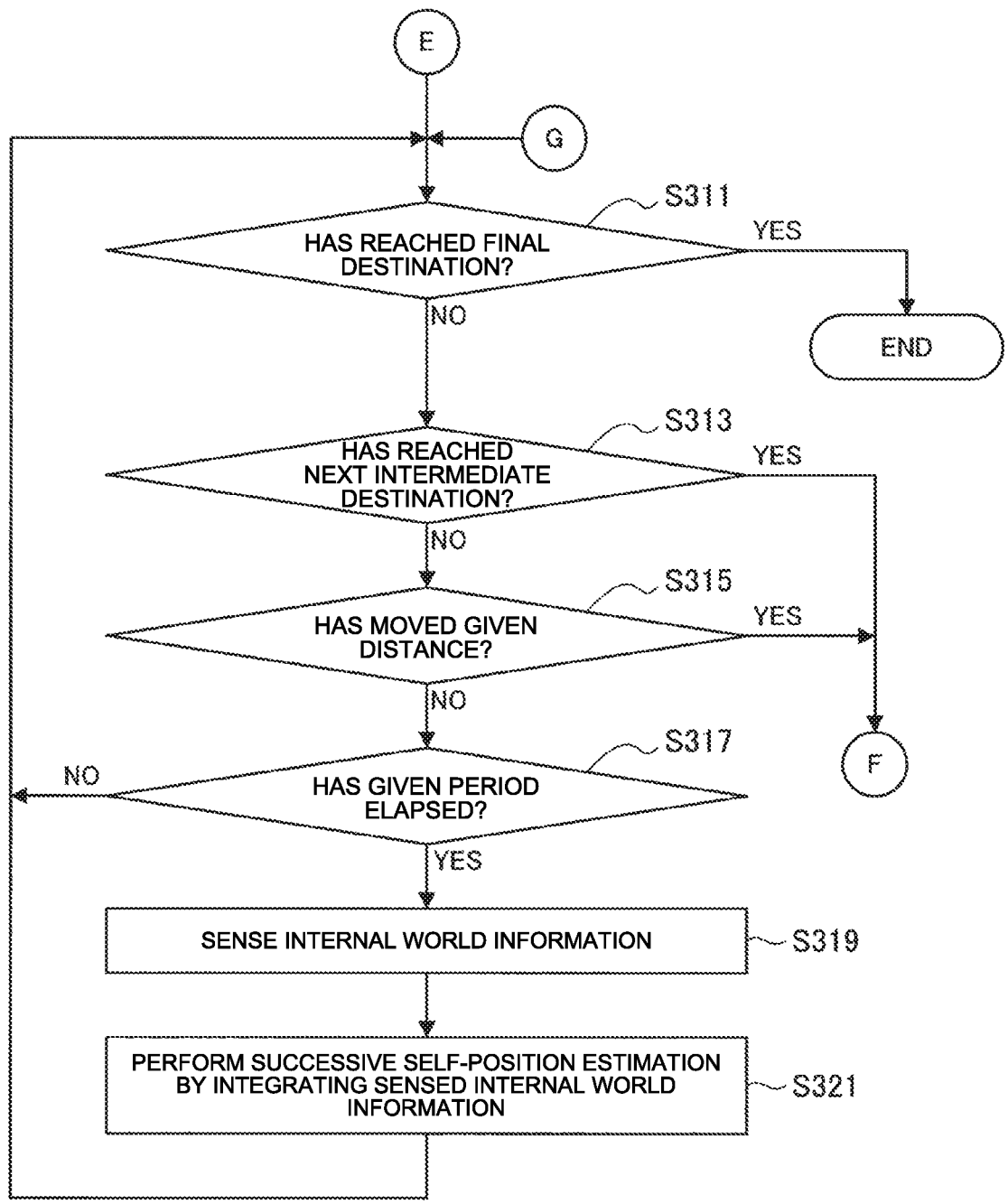
FIG. 16 is a flowchart illustrating part of the process flow according to Application Example 2 of the embodiment.
Figure 17:
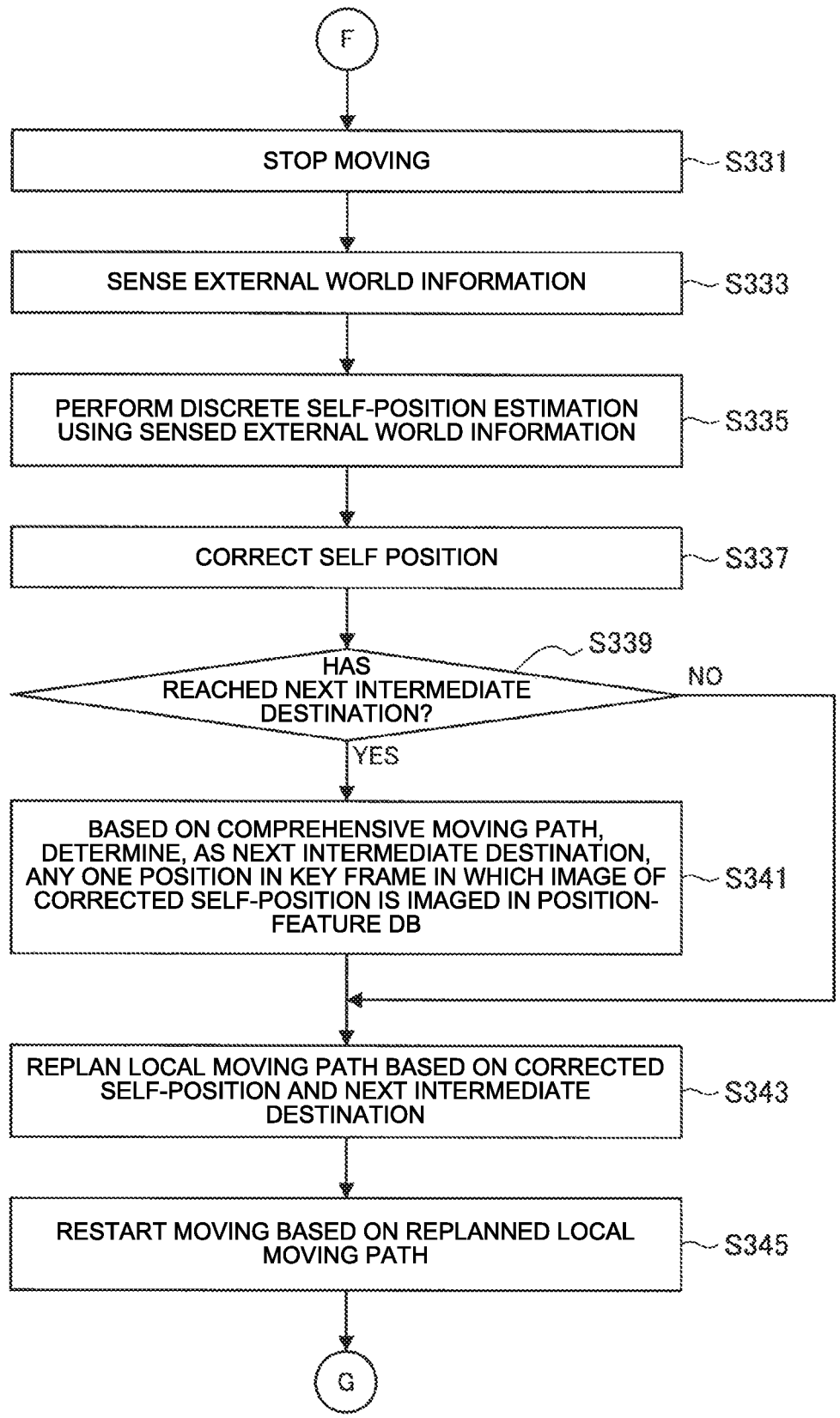
FIG. 17 is a flowchart illustrating part of the process flow according to Application Example 2 of the embodiment.

A process flow according to Application Example 2 will be described with reference to FIGS. 15 to 17. FIGS. 15 to 17 are flowcharts each illustrating part of the process flow according to Application Example 2. The example in which the autonomous mobile object 10 is positioned at a starting point and moves to a final destination will be described. Completion of moving a given distance is determined herein as the stop condition.

As illustrated in FIG. 15, first of all, the behavior planner 152 of the autonomous mobile object 10 plans a (comprehensive) moving path of the autonomous mobile object 10 based on positional information of the starting point, positional information of the final destination, and a given path determination method (S301).

The external world sensor unit 174 senses external world information, for example, captures an image of a surrounding space (S303).

The behavior planner 152 performs matching between the multiple key frames that are stored in the position-feature DB 178 and the image that is captured at S303, thereby specifying a key frame in which the current position (that is, the starting point) of the autonomous mobile object 10 is contained among the multiple key frames. Based on the moving path that is planned at S301, the behavior planner 152 determines any one location in an area of which image is captured in the specified key frame as the next intermediate destination (that is, the next intermediate destination) (S305).

Subsequently, the behavior planner 152 plans a local moving path based on the positional information of the starting point and positional information of the next intermediate destination that is determined at S305 (S307).

The movement controller 158 controls the mobile mechanism 180 such that the autonomous mobile object 10 starts moving and moves based on the moving path that is planned at S307 (S309).

With reference to FIG. 16, the process flow after S309 will be described. As illustrated in FIG. 16, first of all, when the autonomous mobile object 10 has reached the final destination (S311: YES), the process flow ends.

On the other hand, unless the autonomous mobile object 10 has reached the final destination (S311: NO), the autonomous mobile object 10 repeats the following process from S313 to S321. Specifically, first of all, the controller 150 of the autonomous mobile object 10 determines whether the autonomous mobile object 10 has reached the next intermediate destination (S313). When the autonomous mobile object 10 has reached the next intermediate destination (S313: YES), the controller 150 performs the process at and after S331 to be described below. When the autonomous mobile object 10 has not reached the next intermediate destination (S311: NO), the autonomous mobile object 10 performs the same process as that from S107 to S113 illustrated in FIG. 7 (S315 to S321).

With reference to FIG. 17, the process flow in the case where the autonomous mobile object 10 has reached the next intermediate destination at S313 (S313: YES) and the case where the distance that the autonomous mobile object 10 has moved reaches the given distance at S315 (S315: YES) will be described. S331 to S337 illustrated in FIG. 17 are schematically the same as S121 to S127 illustrated in FIG. 8.

As illustrated in FIG. 17, after S337 and when the autonomous mobile object 10 has not reached the next intermediate destination (S339: NO), the behavior planner 152 performs the process at and after S343 to be described below.

On the other hand, after S337 and when the autonomous mobile object 10 has reached the next intermediate destination (S339: YES), based on the comprehensive moving path that is planned at S301, the behavior planner 152 determines, as the next intermediate destination, any one location in an area of which image is captured in one key frame that is used for the discrete self-position estimation at previous S335 among the key frames that are stored in the position-feature DB 178 (S341).

Subsequently, the behavior planner 152 replans a local moving path based on a self-position that is estimated at S335, positional information of the next intermediate destination, and the given path determination method (S343).

The process at and after S345 illustrated in FIG. 17 is schematically the same as the process at and after S131 illustrated in FIG. 8.

4. Modification

The preferable embodiment of the disclosure has been described in detail with reference to the accompanying drawings; however, the technical scope of the disclosure is not limited to the examples. It is obvious that those with general knowledge in the technical field to which the disclosure belongs can reach various modifications or corrections within the scope of the technical idea described in the claims and it is understood that they naturally belong to the technical scope of the disclosure.

4-1. Modification 1

In the above-described embodiment, the example in which the information processing apparatus according to the disclosure is the autonomous mobile object 10 has been described; however, the disclosure is not limited to the example. The information processing apparatus may be, for example, a server, a general-purpose PC (Personal Computer), a tablet terminal device, a game machine, a mobile phone, such as a smartphone, a wearable device, such as a HMD (Head Mounted Display) or a smartwatch, or an in-vehicle device (such as a car navigation device).

In this case, the information processing device can control the behavior of the autonomous mobile object 10, for example, via the above-described network. For example, based on whether the state of the autonomous mobile object 10 is the stopped state, the information processing apparatus determines which of the successive self-position estimation and the discrete self-position estimation is used by the autonomous mobile object 10 to estimate a self-position.

4-2. Modification 2

Each step of each of the processes described above is not necessarily implemented according to the order described herein. For example, each step may be implemented in an order that is changed as appropriate. Each step may be implemented in parallel partly or individually instead of being implemented chronologically. Part of the steps described may be omitted or another step may be added.

According to each above-described embodiment, it is possible to provide a computer program for hardware, such as a CPU, a ROM or a RAM, to implement the same function as that of each component (for example, the controller 150) of the autonomous mobile object 10 according to each above-described embodiment. A storage medium in which the computer program is recorded is also provided.

The effects described herein are explanatory and exemplary only and thus are not definitive. In other words, the technique according to the disclosure can achieve, together with the above-described effects or instead of the above-described effects, other effects obvious to those skilled in the art from the description herein.

The following configuration also belongs to the technical scope of the disclosure.

(1)

An information processing apparatus including:
a controller that, when an autonomous mobile object estimates a self-position, determines which of a first estimation method using a result of sensing by a first sensor unit configured to sense internal world information in relation to the autonomous mobile object and a second estimation method using a result of sensing by a second sensor unit configured to sense external world information in relation to the autonomous mobile object is used by the autonomous mobile object based on whether a state of the autonomous mobile object is a stopped state.

(2)

The information processing apparatus according to (1), wherein the first estimation method is a method of estimating a self-position of the autonomous mobile object by integrating results of sensing the internal world information by the first sensor unit at respective sets of sensing timing until now.

(3)

The information processing apparatus according to (2), wherein the second estimation method is a method of estimating a self-position of the autonomous mobile object using a result of sensing the external world information by the second sensor unit at one set of sensing timing.

(4)

The information processing apparatus according to (3), wherein
the first sensor unit is configured to sense the internal world information periodically, and
the first estimation method is a method of estimating the self-positon periodically by periodically integrating the results of sensing the internal world information by the first sensor unit at the respective sets of timing until now.

(5)

The information processing apparatus according to (4), wherein
the second sensor unit includes an imaging unit,
the information processing apparatus further includes a storage that stores key frames obtained by previously capturing images in multiple locations in a real space and positional information of the locations in association with each other, and
the second estimation method is a method of collating an image that is captured by the imaging unit at the one set of sensing timing and each of the multiple key frames that are stored in the storage and estimating a self-position of the autonomous mobile object based on the positional information that is associated with the key frame whose corresponding result of the collating meets a given condition among the key frames.

(6)

The information processing apparatus according to any one of (3) to (5), wherein
unless the state of the autonomous mobile object is the stopped state, the controller determines to cause the autonomous mobile object to estimate the self-position using the first estimation method, and
when the state of the autonomous mobile object turns into the stopped state, the controller determines to cause the autonomous mobile object to estimate the self-position using the second estimation method.

(7)

The information processing apparatus according to (6), wherein
unless the state of the autonomous mobile object is the stopped state, the controller causes the autonomous mobile object to estimate the self-position periodically using the first estimation method, and
at each set of timing when the state of the autonomous mobile object is changed to the stopped state, the controller causes the autonomous mobile object to sequentially estimate the self-position using the second estimation method at the timing.

(8)

The information processing apparatus according to (7), wherein the controller further plans a stop condition for changing the state of the autonomous mobile object from the moving state to the stopped state.

(9)

The information processing apparatus according to (8), further including a storage that stores key frames obtained by previously capturing images in multiple locations in a real space and positional information of the locations in association with each other,
- wherein the controller plans the stop condition such that the state of the autonomous mobile object is changed from the moving state to the stopped state in any one location in an area of which image is captured in at least one of the multiple key frames that are stored in the storage.

(10)

The information processing apparatus according to (9), wherein at each set of timing when the state of the autonomous mobile object is changed from the moving state to the stopped state, the controller replans a moving path of the autonomous mobile object after the timing based on the self-position that is estimated using the second estimation method at the timing and a given destination of the autonomous mobile object.

(11)

The information processing apparatus according to (10), wherein
- the given destination is a location within a given distance from a location in which a given mobile object that is movable in the real space is positioned, and
- at each set of timing when the state of the autonomous mobile object is changed from the moving state to the stopped state, the controller specifies a location in which the given mobile object is positioned at the timing using the external world information that is sensed by the second sensor unit at the timing,
- redetermines the given destination at the timing according to the location in which the given mobile object is positioned at the timing, and
- replans a moving path of the autonomous mobile object after the timing based on the self-positon that is estimated at the timing using the second estimation method and the given destination that is redetermined at the timing.

(12)

The information processing apparatus according to (10), wherein
- the given destination is a given location on the way on which the autonomous mobile object moves to a final destination,
- the second sensor unit includes an imaging unit,
- the second estimating method is a method of collating an image that is captured by the imaging unit at the one set of sensing timing and each of the multiple key frames that are stored in the storage and estimating a self-position of the autonomous mobile object based on the positional information that is associated with the key frame whose corresponding result of the collating meets a given condition among the key frames, and
- when the self-position of the autonomous mobile object is estimated using the second estimation method, the controller further redetermines, as the given destination, any one location in an area of which image is captured in the key frame whose corresponding result of the collating at the timing meets the given condition.

(13)

The information processing apparatus according to (12), wherein when the self-position of the autonomous mobile object is estimated using the second estimation method, the controller further redetermines, as the given destination, any one location in the area of which image is captured in the key frame whose corresponding result of the collating at the timing meets the given condition based on the final destination of the autonomous mobile object.

(14)

The information processing apparatus according to any one of (10) to (13), wherein the controller further plans the stop condition such that the state of the autonomous mobile object is sequentially changed from the moving state to the stopped state each time the autonomous mobile object continuously moves a given distance.

(15)

The information processing apparatus according to (14), wherein, at each set of timing when the first sensor unit acquires a result of sensing the internal world information while the state of the autonomous mobile object is the moving state, the controller successively specifies a condition of the ground on which the autonomous mobile object is moving based on the result of sensing the internal world information that is acquired at the timing, and
- changes a length of the given distance according to the specified condition of the ground.

(16)

The information processing apparatus according to (15), wherein the condition of the ground includes slipperiness of the ground, a degree of unevenness of the ground or a degree of inclination of the ground.

(17)

The information processing apparatus according to any one of (10) to (16), wherein the controller controls movement of the autonomous mobile object such that the state of the autonomous mobile object turns from the moving state into the stopped state at timing when the stop condition is met while the state of the autonomous mobile object is the moving state.

(18)

The information processing apparatus according to (17), wherein
- the information processing apparatus is the autonomous mobile object, and
- the controller further estimates a self-position of the information processing apparatus using the determined estimation method.

(19)

An information processing method including:
- by a processor, when an autonomous mobile object estimates a self-position, determining which of a first estimation method using a result of sensing by a first sensor unit configured to sense internal world information in relation to the autonomous mobile object and a second estimation method using a result of sensing by a second sensor unit configured to sense external world information in relation to the autonomous mobile object is used by the autonomous mobile object based on whether a state of the autonomous mobile object is a stopped state.

(20)

A program for causing a computer to function as a controller that, when an autonomous mobile object estimates a self-position, determines which of a first estimation method using a result of sensing by a first sensor unit configured to sense internal world information in relation to the autonomous mobile object and a second estimation method using a result of sensing by a second sensor unit configured to sense external world information in relation to the autonomous mobile object is used by the autonomous mobile object based on whether a state of the autonomous mobile object is a stopped state.

REFERENCE SIGNS LIST

10 AUTONOMOUS MOBILE OBJECT
100 HEAD
102 BODY
150 CONTROLLER
152 BEHAVIOR PLANNER
154 STATE DETERMINATION UNIT
156 SELF-POSITION ESTIMATOR
158 MOVEMENT CONTROLLER
170 COMMUNICATION UNIT
172 INTERNAL WORLD SENSOR UNIT
174 EXTERNAL WORLD SENSOR UNIT
176 STORAGE
178 POSITION-FEATURE DB
180 MOBILE MECHANISM

The invention claimed is:

1. An information processing apparatus, comprising:
a first sensor unit configured to periodically sense internal world information associated with an autonomous mobile object to output a plurality of first sensing results;
a second sensor unit configured to sense external world information associated with the autonomous mobile object to output a second sensing result;
a storage configured to store:
a plurality of key frames obtained by previously capturing images at multiple locations in a real space; and
positional information of the multiple locations in association with the plurality of key frames; and
a controller configured to:
determine a state of the autonomous mobile object is one of a stopped state or a moving state;
determine, based on the determination that the state of the autonomous mobile object is the moving state, that a first estimation method is to be used by the autonomous mobile object for an estimation of a self-position of the autonomous mobile object;
determine, based on the determination that the state of the autonomous mobile object is the stopped state, that a second estimation method is to be used by the autonomous mobile object for the estimation of the self-position of the autonomous mobile object;
periodically estimate, by the first estimation method, the self-position by a periodic integration of the plurality of first sensing results that corresponds to a plurality of first timings until a current time;
estimate, by the second estimation method, the self-position based on the second sensing result, and the positional information of the multiple locations in association with the plurality of key frames;
successively specify, at a first timing of the plurality of first timings when the first sensor unit acquires a first sensing result of the plurality of first sensing results while the state of the autonomous mobile object is the moving state, a condition of a ground on which the autonomous mobile object is moving based on the first sensing result acquired at the first timing;
change, at the first timing, a length of a given distance based on the specified condition of the ground; and
plan a stop condition such that the state of the autonomous mobile object is sequentially changed from the moving state to the stopped state,
wherein the stop condition is planned based on a continuous movement of the autonomous mobile object by the given distance.

2. The information processing apparatus according to claim 1, wherein the controller is further configured to estimate, by the second estimation method, the self-position of the autonomous mobile object based on the second sensing result at a second timing.

3. The information processing apparatus according to claim 2, wherein
the second sensor unit includes an imaging unit, and
the second estimation method includes:
a collation of an image that is captured by the imaging unit at the second timing and each key frame of the plurality of key frames that is stored in the storage; and
the estimation of the self-position of the autonomous mobile object based on the positional information that is associated with a first key frame of the plurality of key frames whose result of the collation meets a given condition among the plurality of key frames.

4. The information processing apparatus according to claim 2, wherein
unless the state of the autonomous mobile object is the stopped state, the controller is further configured to estimate the self-position by the first estimation method, and
when the state of the autonomous mobile object turns into the stopped state, the controller is further configured to estimate the self-position by the second estimation method.

5. The information processing apparatus according to claim 4, wherein
at the second timing when the state of the autonomous mobile object is changed to the stopped state, the controller is further configured to sequentially estimate the self-position by the second estimation method at the second timing.

6. The information processing apparatus according to claim 5, wherein the controller is further configured to plan the stop condition such that the state of the autonomous mobile object is changed from the moving state to the stopped state in a first location in an area whose image is captured in at least one key frame of the plurality of key frames that is stored in the storage, and the multiple locations include the first location.

7. The information processing apparatus according to claim 6, wherein
at each timing of a plurality of second timings when the state of the autonomous mobile object is changed from the moving state to the stopped state, the controller is further configured to replan a moving path of the autonomous mobile object after each timing of the plurality of second timings based on the self-position and a given destination of the autonomous mobile object,
the plurality of second timings includes the second timing, and the self-position is estimated by the second estimation method at each timing of the plurality of second timings.

8. The information processing apparatus according to claim 7, wherein
the given destination is a second location within a distance from the first location in which the autonomous mobile object is positioned,
the autonomous mobile object is movable in the real space, and
at the second timing when the state of the autonomous mobile object is changed from the moving state to the stopped state, the controller is further configured to:
specify the first location at the second timing based on the external world information that is sensed by the second sensor unit at the second timing;
redetermine the given destination based on the first location in which the autonomous mobile object is positioned at the second timing; and
replan the moving path of the autonomous mobile object after the second timing based on the self-position and the given destination that is redetermined at the second timing.

9. The information processing apparatus according to claim 7, wherein
the given destination is a second location on a way on which the autonomous mobile object moves to a final destination,
the second sensor unit includes an imaging unit,
the second estimating method includes:
a collation of an image that is captured by the imaging unit at the second timing and each key frame of the plurality of key frames that is stored in the storage; and
the estimation of the self-position of the autonomous mobile object based on the positional information that is associated with a first key frame of the plurality of key frames whose result of the collation meets a given condition among the plurality of key frames, and
when the self-position of the autonomous mobile object is estimated by the second estimation method, the controller is further configured to redetermine, as the given destination, a third location in the area whose image is captured in the first key frame.

10. The information processing apparatus according to claim 9, wherein when the self-position of the autonomous mobile object is estimated by the second estimation method, the controller is further configured to redetermine, as the given destination, the third location in the area based on the final destination of the autonomous mobile object.

11. The information processing apparatus according to claim 1, wherein the condition of the ground includes at least one of a slipperiness of the ground, a degree of unevenness of the ground, or a degree of inclination of the ground.

12. The information processing apparatus according to claim 7, wherein the controller is further configured to control a movement of the autonomous mobile object such that the state of the autonomous mobile object turns from the moving state into the stopped state at the second timing when the stop condition is met while the state of the autonomous mobile object is the moving state.

13. The information processing apparatus according to claim 12, wherein
the information processing apparatus is the autonomous mobile object, and
the controller is further configured to estimate a self-position of the information processing apparatus by one of the first estimation method or the second estimation method.

14. An information processing method, comprising:
periodically sensing, by a first sensor unit, internal world information associated with an autonomous mobile object to output a plurality of first sensing results;
sensing, by a second sensor unit, external world information associated with the autonomous mobile object to output a second sensing result;
storing, in a storage, a plurality of key frames obtained by previously capturing images at multiple locations in a real space;
storing, in the storage, positional information of the multiple locations in association with the plurality of key frames;
determining, by a processor, a state of the autonomous mobile object is one of a stopped state or a moving state;
determining, by the processor, that a first estimation method is to be used by the autonomous mobile object for an estimation of a self-position of the autonomous mobile object, wherein the determination that the first estimation method is to be used by the autonomous mobile object is based on the determination that the state of the autonomous mobile object is the moving state;
determining, by the processor, that a second estimation method is to be used by the autonomous mobile object for the estimation of the self-position of the autonomous mobile object, wherein the determination that the second estimation method is to be used by the autonomous mobile object is based on the determination that the state of the autonomous mobile object is the stopped state;
periodically estimating, by the processor, the self-position by the first estimation method by periodically integrating the plurality of first sensing results that corresponds to a plurality of timings until a current time;
estimating, by the processor, the self-position by the second estimation method based on the second sensing result, and the positional information of the multiple locations in association with the plurality of key frames;
successively specifying, at a first timing of the plurality of timings when the first sensor unit acquires a first sensing result of the plurality of first sensing results while the state of the autonomous mobile object is the moving state, a condition of a ground on which the autonomous mobile object is moving based on the first sensing result acquired at the first timing;
changing, at the first timing, a length of a given distance based on the specified condition of the ground; and
planning a stop condition such that the state of the autonomous mobile object is sequentially changed from the moving state to the stopped state,
wherein the stop condition is planned based on a continuous movement of the autonomous mobile object by the given distance.

15. A non-transitory computer-readable medium having stored thereon, computer-executable instructions which, when executed by an information processing apparatus, cause the information processing apparatus to execute operations, the operations comprising:

periodically sensing, by a first sensor unit, internal world information associated with an autonomous mobile object to output a plurality of first sensing results;

sensing, by a second sensor unit, external world information associated with the autonomous mobile object to output a second sensing result;

storing, in a storage, a plurality of key frames obtained by previously capturing images at multiple locations in a real space;

storing, in the storage, positional information of the multiple locations in association with the plurality of key frames;

determining, by a processor, a state of the autonomous mobile object is one of a stopped state or a moving state;

determining, by the processor, that a first estimation method is to be used by the autonomous mobile object for an estimation of a self-position of the autonomous mobile object, wherein the determination that the first estimation method is to be used by the autonomous mobile object is based on the determination that the state of the autonomous mobile object is the moving state;

determining, by the processor, that a second estimation method is to be used by the autonomous mobile object for the estimation of the self-position of the autonomous mobile object, wherein the determination that the second estimation method is to be used by the autonomous mobile object is based on the determination that the state of the autonomous mobile object is the stopped state;

periodically estimating, by the processor, the self-position by the first estimation method by periodically integrating the plurality of first sensing results that corresponds to a plurality of timings until a current time;

estimating, by the processor, the self-position by the second estimation method based on the second sensing result, and the positional information of the multiple locations in association with the plurality of key frames;

successively specifying, at a first timing of the plurality of timings when the first sensor unit acquires a first sensing result of the plurality of first sensing results while the state of the autonomous mobile object is the moving state, a condition of a ground on which the autonomous mobile object is moving based on the first sensing result acquired at the first timing;

changing, at the first timing, a length of a given distance based on the specified condition of the ground; and planning a stop condition such that the state of the autonomous mobile object is sequentially changed from the moving state to the stopped state, wherein the stop condition is planned based on a continuous movement of the autonomous mobile object by the given distance.

16. An information processing apparatus, comprising:

a first sensor unit configured to periodically sense internal world information associated with an autonomous mobile object to output a plurality of first sensing results;

a second sensor unit configured to sense external world information associated with the autonomous mobile object to output a second sensing result; and a controller configured to:
  determine a state of the autonomous mobile object is one of a stopped state or a moving state;
  determine, based on the state of the autonomous mobile object, whether a first estimation method or a second estimation method is to be used by the autonomous mobile object for an estimation of a self-position of the autonomous mobile object; and
  replan, at each timing of a plurality of timings when the state of the autonomous mobile object is changed from the moving state to the stopped state, a moving path of the autonomous mobile object after each timing of the plurality of timings based on the self-position and a given destination of the autonomous mobile object,
  wherein the self-position is estimated by the second estimation method at each timing of the plurality of timings.

\* \* \* \* \*